United States Patent
Palanki et al.

(10) Patent No.: US 9,203,564 B2
(45) Date of Patent: Dec. 1, 2015

(54) DATA TRANSMISSION VIA A RELAY STATION IN A WIRELESS COMMUNICATION SYSTEM

(75) Inventors: Ravi Palanki, San Diego, CA (US); Kapil Bhattad, San Diego, CA (US); Naga Bhushan, San Diego, CA (US); Aamod D. Khandekar, San Diego, CA (US); Tingfang Ji, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1371 days.

(21) Appl. No.: 12/580,872

(22) Filed: Oct. 16, 2009

(65) Prior Publication Data

US 2010/0097978 A1  Apr. 22, 2010

Related U.S. Application Data

(60) Provisional application No. 61/106,917, filed on Oct. 20, 2008.

(51) Int. Cl.
*H04L 1/18* (2006.01)
*H04B 7/26* (2006.01)

(52) U.S. Cl.
CPC ............ *H04L 1/1867* (2013.01); *H04B 7/2606* (2013.01)

(58) Field of Classification Search
CPC ........................... H04L 1/1867; H04B 7/2606
USPC .......................................................... 370/315
See application file for complete search history.

(56) References Cited

U.S. PATENT DOCUMENTS 6,285,665 B1 9/2001 Chuah
6,708,042 B1 3/2004 Hayakawa
(Continued)

FOREIGN PATENT DOCUMENTS

CN 101072085 A 11/2007
EP 1863210 A1 12/2007
(Continued)

OTHER PUBLICATIONS

Downlink Control Channel Design of IEEE 802.16m, IEEE, Piscataway, NJ, USA, Mar. 17, 2008, pp. 1-9, XP040391877 p. 1, line 1-p. 2, line 18 figures 1-3.
(Continued)

*Primary Examiner* — Luat Phung
*Assistant Examiner* — Saad A Waqas
(74) *Attorney, Agent, or Firm* — Ke Liu

(57) ABSTRACT

Techniques for supporting data transmission via a relay station are described. In an aspect, data transmission may be supported using ACK-and-suspend. A transmitter station sends a first transmission of a packet to a receiver station. The transmitter station receives no ACK information for the first transmission of the packet and suspends transmission of the packet. The transmitter station thereafter receives an indication to resume transmission of the packet and, in response, sends a second transmission of the packet. In another aspect, different ACK timeline may be used when applicable. The receiver station may send ACK information in a designated subframe if available for use or in a different subframe. In yet another aspect, ACK repetition may be used. The receiver may send ACK information in multiple subframes to facilitate reception of the ACK information when the transmitter station is unable to receive one or more of the multiple subframes.

30 Claims, 15 Drawing Sheets

(56) References Cited

U.S. PATENT DOCUMENTS

| | | | |
|---|---|---|---|
| 6,975,608 B1 | 12/2005 | Park et al. | |
| 7,092,434 B2 | 8/2006 | Moon et al. | |
| 7,130,352 B2 | 10/2006 | Shimizu | |
| RE39,375 E | 11/2006 | Hamalainen et al. | |
| 7,161,957 B2 | 1/2007 | Wang et al. | |
| 7,304,980 B2 | 12/2007 | Amano | |
| 7,936,741 B2 | 5/2011 | Vimpari et al. | |
| 8,155,222 B2 | 4/2012 | McBeath et al. | |
| 8,498,650 B2 | 7/2013 | Fernandez-Corbaton et al. | |
| 2002/0093918 A1* | 7/2002 | Kim et al. | 370/278 |
| 2002/0159410 A1* | 10/2002 | Odenwalder et al. | 370/329 |
| 2003/0012195 A1 | 1/2003 | Ohkubo et al. | |
| 2003/0052909 A1 | 3/2003 | Mo et al. | |
| 2003/0123559 A1 | 7/2003 | Classon et al. | |
| 2003/0169722 A1 | 9/2003 | Petrus et al. | |
| 2004/0148422 A1 | 7/2004 | Ikedo | |
| 2004/0184417 A1 | 9/2004 | Chen et al. | |
| 2004/0196801 A1 | 10/2004 | Hiramatsu | |
| 2004/0196870 A1 | 10/2004 | Cheng et al. | |
| 2005/0002324 A1 | 1/2005 | Sutivong et al. | |
| 2005/0018629 A1* | 1/2005 | Kwon et al. | 370/328 |
| 2005/0050427 A1 | 3/2005 | Jeong et al. | |
| 2005/0201279 A1* | 9/2005 | Tan et al. | 370/229 |
| 2005/0259629 A1 | 11/2005 | Oliver et al. | |
| 2005/0265302 A1 | 12/2005 | Nishibayashi et al. | |
| 2005/0272403 A1 | 12/2005 | Ryu et al. | |
| 2006/0146762 A1* | 7/2006 | Kuroda et al. | 370/335 |
| 2006/0183441 A1 | 8/2006 | Irie et al. | |
| 2006/0198325 A1 | 9/2006 | Gao et al. | |
| 2006/0262839 A1 | 11/2006 | Tseng et al. | |
| 2006/0281417 A1 | 12/2006 | Umesh et al. | |
| 2006/0293076 A1 | 12/2006 | Julian et al. | |
| 2007/0049305 A1 | 3/2007 | Bachl et al. | |
| 2007/0086367 A1 | 4/2007 | Sung et al. | |
| 2007/0099577 A1 | 5/2007 | Lee et al. | |
| 2007/0147517 A1 | 6/2007 | Hu | |
| 2007/0155315 A1 | 7/2007 | Lee et al. | |
| 2007/0173194 A1 | 7/2007 | Vare et al. | |
| 2007/0189164 A1 | 8/2007 | Smith et al. | |
| 2007/0190933 A1 | 8/2007 | Zheng et al. | |
| 2007/0297351 A1 | 12/2007 | Trainin | |
| 2008/0032625 A1 | 2/2008 | Cheung et al. | |
| 2008/0045272 A1 | 2/2008 | Wang et al. | |
| 2008/0049669 A1 | 2/2008 | Lundby et al. | |
| 2008/0049706 A1 | 2/2008 | Khandekar et al. | |
| 2008/0056205 A1 | 3/2008 | Nagai | |
| 2008/0068979 A1* | 3/2008 | Visotsky et al. | 370/208 |
| 2008/0095106 A1 | 4/2008 | Malladi et al. | |
| 2008/0107062 A1 | 5/2008 | Viorel et al. | |
| 2008/0108355 A1 | 5/2008 | Oleszcsuk | |
| 2008/0117891 A1 | 5/2008 | Damnjanovic et al. | |
| 2008/0144612 A1 | 6/2008 | Honkasalo et al. | |
| 2008/0165797 A1 | 7/2008 | Aceves et al. | |
| 2008/0186900 A1 | 8/2008 | Chang et al. | |
| 2008/0212520 A1 | 9/2008 | Chen et al. | |
| 2008/0227386 A1 | 9/2008 | Dayal et al. | |
| 2008/0227461 A1 | 9/2008 | Dayal et al. | |
| 2008/0232396 A1 | 9/2008 | Buckley et al. | |
| 2008/0247354 A1* | 10/2008 | Hsieh et al. | 370/328 |
| 2008/0267129 A1* | 10/2008 | Torsner et al. | 370/331 |
| 2008/0273610 A1 | 11/2008 | Malladi et al. | |
| 2009/0031185 A1* | 1/2009 | Xhafa et al. | 714/751 |
| 2009/0049356 A1* | 2/2009 | Lin | 714/749 |
| 2009/0092085 A1 | 4/2009 | Ramesh et al. | |
| 2009/0103498 A1 | 4/2009 | Nilsson et al. | |
| 2009/0135807 A1 | 5/2009 | Shrivastava et al. | |
| 2009/0147717 A1 | 6/2009 | Cai | |
| 2009/0154356 A1* | 6/2009 | Wiemann et al. | 370/236 |
| 2009/0175179 A1 | 7/2009 | Stewart et al. | |
| 2009/0241004 A1 | 9/2009 | Ahn et al. | |
| 2009/0323641 A1 | 12/2009 | Futagi et al. | |
| 2010/0008242 A1 | 1/2010 | Schein | |
| 2010/0027446 A1 | 2/2010 | Choi et al. | |
| 2010/0080139 A1 | 4/2010 | Palanki et al. | |
| 2010/0080166 A1 | 4/2010 | Palanki et al. | |
| 2010/0111058 A1* | 5/2010 | Fischer | 370/338 |
| 2010/0278134 A1 | 11/2010 | Ankel et al. | |
| 2010/0303045 A1 | 12/2010 | Venkob et al. | |
| 2011/0044195 A1* | 2/2011 | Wiemann et al. | 370/252 |
| 2011/0051643 A1 | 3/2011 | Hans et al. | |
| 2011/0103338 A1 | 5/2011 | Astely et al. | |
| 2011/0145672 A1* | 6/2011 | Jongren et al. | 714/748 |
| 2012/0093061 A1* | 4/2012 | Charbit et al. | 370/315 |
| 2013/0012119 A1 | 1/2013 | Ma et al. | |
| 2015/0055545 A1 | 2/2015 | Palanki et al. | |

FOREIGN PATENT DOCUMENTS

| | | |
|---|---|---|
| EP | 1863210 A1 * | 12/2007 |
| EP | 1890446 A2 | 2/2008 |
| EP | 1919100 A2 | 5/2008 |
| EP | 1919143 A2 | 5/2008 |
| EP | 1931155 A1 | 6/2008 |
| EP | 1933489 A1 | 6/2008 |
| EP | 1965534 A2 | 9/2008 |
| GB | 2417862 | 3/2006 |
| GB | 2443466 | 5/2008 |
| JP | 2007013344 A | 1/2007 |
| JP | 2008118659 A | 5/2008 |
| JP | 2010524294 A | 7/2010 |
| KR | 20020039122 A | 5/2002 |
| KR | 20020056986 A | 7/2002 |
| KR | 20050067331 A | 7/2005 |
| KR | 20070072984 A | 7/2007 |
| KR | 20080064743 A | 7/2008 |
| KR | 20080065245 A | 7/2008 |
| KR | 20080085770 A | 9/2008 |
| WO | 2005057976 A1 | 6/2005 |
| WO | WO 2007095967 A1 * | 8/2007 |
| WO | 2007133022 A1 | 11/2007 |
| WO | WO2008020164 A1 | 2/2008 |
| WO | WO2008020738 A1 | 2/2008 |
| WO | WO2008024282 | 2/2008 |
| WO | WO2008024578 | 2/2008 |
| WO | 2008036784 A2 | 3/2008 |
| WO | 2008056774 A1 | 5/2008 |
| WO | WO2008056235 | 5/2008 |
| WO | WO 2008093233 A2 * | 8/2008 |
| WO | 2008115003 A2 | 9/2008 |
| WO | 2008118064 A2 | 10/2008 |

OTHER PUBLICATIONS

Ericsson et al: "Uplink ACK/NACK timing for TDD" 3GPP Draft; RI-081542, 3rd Generation Partnership Project (3GPP), Mobile Competence Centre ; 650, Route des Lucioles ; F-06921 Sophia-Antipolis Cedex ; France, vol. RAN WGI, no. Shenzhen, China; Mar. 27, 2008, XP050109955.

Haihong Zheng et al: "HARQ with Relays" IEEE 802.16 Broadband Wireless Access Working Group, IEEE C802.16J-06/197R,, vol. C802.16J-06/197R, Nov. 7, 2006, pp. 1-9, XP003022082.

International Search Report—PCT/US2009/058875—International Search Authority, European Patent Office, May 6, 2010.

International Search Report and Written Opinion—PCT/US2009/058872, International Search Authority—European Patent Office—May 20, 2010.

International Search Report and Written Opinion—PCT/US2009/067028, International Search Autority—European Patent Office—Jun. 22, 2010.

LG Electronics: "MBMS transmission in E-UTRA" Internet Citation Nov. 7, 2005, XP003015816 Retrieved from the Internet: URL:http://ww.3gpp.org/ftp/tsg_ran/W61_RL1/TSGR1_43/Docs/RI-O51300.zip> [retrieved on Jan. 1, 2007] figures la,2 p. 2, line 1-line 10.

Motorola: Downlink Control Signalling for TDD 3GPP Draft; RI-080074, 3rd Generation Partnership Project (3GPP), Mobile Competence Centre ; 650, Route des Lucioles ; F-06921 Sophia-Antipolis Cedex ; France, vol. RAN WG1, no Sevi11 a, Spain; Jan. 8, 2008, XP050108613 [retrieved on Jan. 8, 2008].

Motorola: "MBSFN Sub-frame Allocation Signalling" 3GPP Draft; R2-081807-MBSFN-SUBFR-ALLOC, 3rd Generation Partnership

(56) References Cited

OTHER PUBLICATIONS

Project (3GPP), Mobile Competence Centre ; 650, Route des Lucioles ; F-06921 Sophia-Antipolis Cedex ; France, vol. RAN WG2, no. Shenzhen, China; Mar. 25, 2008, XP050139504 [retrieved on Mar. 25, 2008] p. 1, line 1-p. 2, line 10 figures 1,2.

Nokia & Nokia Siemens Networks: "Repeated transmission of ACK in TDD FS2 PUCCH" 3GPP Draft; RI-074335, 3rd Generation Partnership Project (3GPP), Mobile Competence Centre ; 650, Route des Lucioles ; F-06921 Sophia-Antipolis Cedex ; France, vol. RAN WGI, no. Shanghai, China; Oct. 2, 2007, XP050107851.

Partial International Search Report—PCT/US09/067028, International Search Authority, European Patent Office—Mar. 8, 2010.

Partial International Search Report—PCT/US09/058872, International Search Authority, European Patent Office—Feb. 8, 2010.

Partial International Search Report—PCT/US09/058875, International Search Authority, European Patent Office—Feb. 18, 2010.

Tao A et al: "A Frame Structure Design for OFDMA-based Multihop Relay Networks" IEEE C802.16J-06/226,, Nov. 7, 2006, pp. 1-8, XP008109072 p. 6, line 12-p. 7, line 6 figures 1-5.

Texas Instruments: "Decode and Forward Relays for E-UTRA enhancements" 3GPP Draft; RI-083533 TI Relay, 3rd Generation Partnership Project (3GPP), Mobile Competence Centre ; 650, Route des Lucioles ; F-06921 Sophia-Antipolis Cedex ; France, no. Prague, Czech Republic; Sep. 24, 2008, XP050316897 [retrieved on Sep. 24, 2008] p. 4, line 5-line 15 p. 5, line 8-line 11 figures 1-3.

Zheng H et al: "HARQ With Relays" Internet Citation, [Online] XP003013952 Retrieved from the Internet: URL:http://www.ieee802.org/16/relay/i ndex. htm1> [retrieved on Jan. 1, 2007] p. 4.

Zhifeng Tao et al: "Frame Structure Design for IEEE 802.16j Mobile Multihop Relay (MMR) Networks" Global Telecommunications Conference, 2007. GL0BEC0M ''07. IEEE, IEEE, Piscataway, NJ, USA, Nov. 1, 2007, pp. 4301-4306, XP031196746 ISBN: 978-1-4244-1042-2 p. 4303, col. 1, line 6-p. 4304, col. 1, line 1 abstract; figure 3.

Nokia Corporation: "Signalling of MBSFN subframe allocation on mixed carrier," 3GPP TSG-RAN WG2 Meeting #62, R2-082162, May 5-9, 2008, 4 pages.

\* cited by examiner

Downlink interlaces 0 & 1 are allocated for backhaul downlink
Downlink interlaces 2 to 7 are allocated for access downlink Uplink interlaces 4 & 5 are allocated for backhaul uplink
Uplink interlaces 0 to 3, 6 & 7 are allocated for access uplink

| | 0 | 1 | 2 | 3 | 4 | 5 | 6 | 7 |
|---|---|---|---|---|---|---|---|---|
| Backhaul Downlink (Freq Ch1) | RX from eNB | RX from eNB | - | - | - | - | - | - |
| Backhaul Uplink (Freq Ch2) | - | - | - | - | TX to eNB | TX to eNB | - | - |

Interlace →

| | 0 | 1 | 2 | 3 | 4 | 5 | 6 | 7 |
|---|---|---|---|---|---|---|---|---|
| Access Downlink (Freq Ch1) | - | - | TX to UEs | TX to UEs | TX to UEs | TX to UEs | TX to UEs | TX to UEs |
| Access Uplink (Freq Ch2) | RX from UEs | RX from UEs | RX from UEs | RX from UEs | - | - | RX from UEs | RX from UEs |

Interlace →

*FIG. 6A*

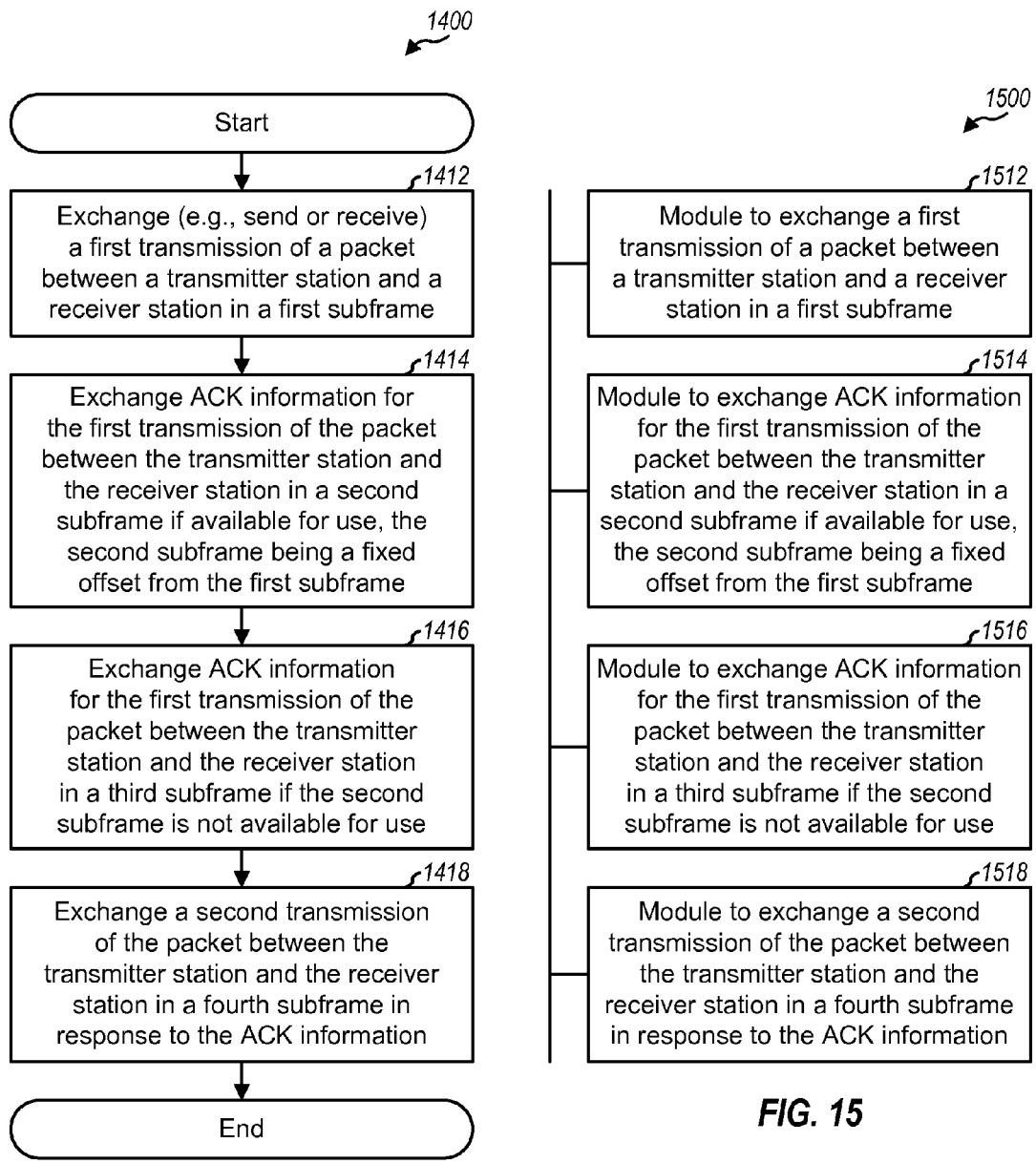

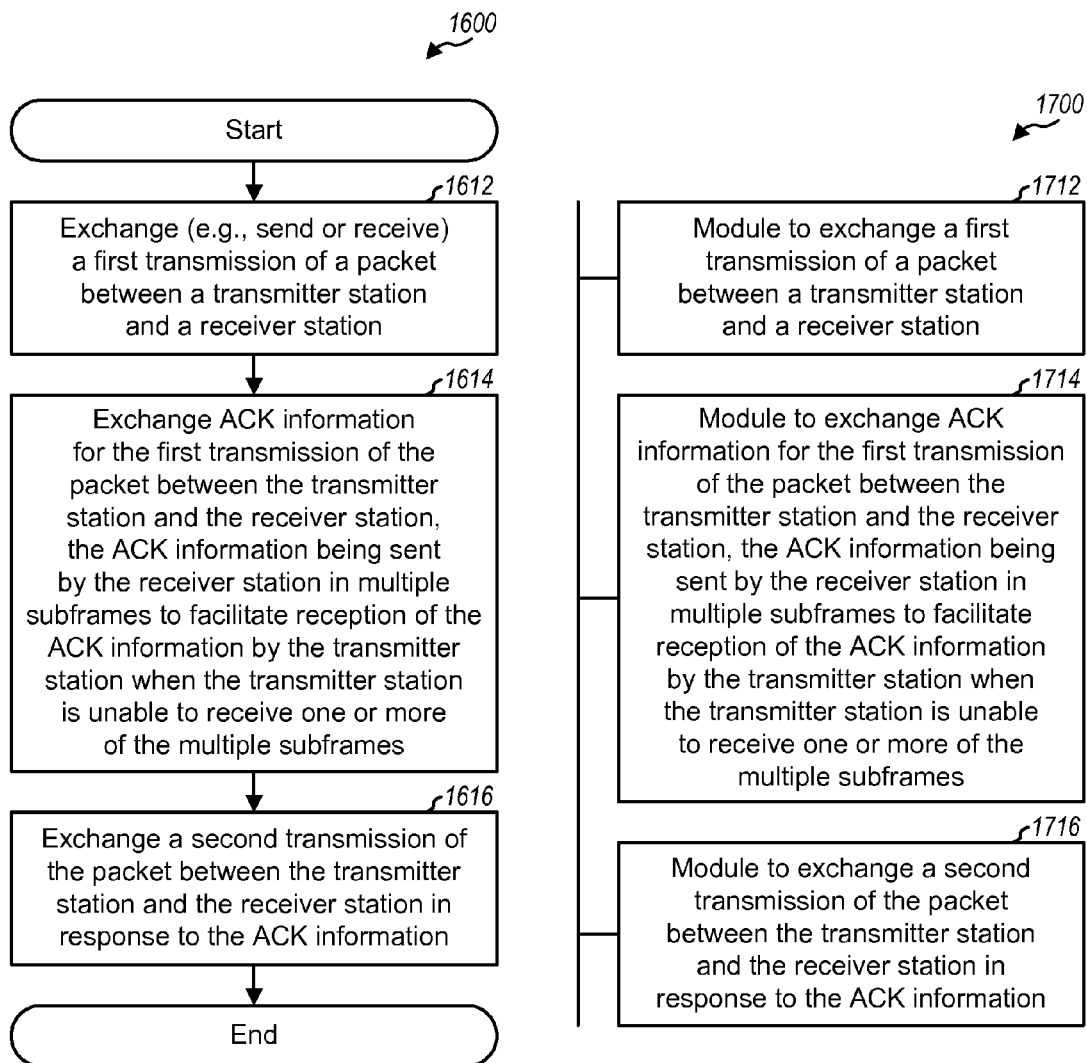

DATA TRANSMISSION VIA A RELAY STATION IN A WIRELESS COMMUNICATION SYSTEM

The present application claims priority to provisional U.S. Application Ser. No. 61/106,917, entitled "RELAY OPERATION TECHNIQUES IN LONG TERM EVOLUTION SYSTEMS," filed Oct. 20, 2008, assigned to the assignee hereof, and incorporated herein by reference.

BACKGROUND

I. Field

The present disclosure relates generally to communication, and more specifically to techniques for supporting data transmission via a relay station in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). The system may also include relay stations that can improve the coverage and capacity of the system without the need for a potentially expensive wired backhaul link. A relay station may be a "decode and forward" station that may receive a signal from an upstream station (e.g., a base station), process the received signal to recover data sent in the signal, generate a relay signal based on the recovered data, and transmit the relay signal to a downstream station (e.g., a UE).

A relay station may communicate with a base station on a backhaul link and may appear as a UE to the base station. The relay station may also communicate with one or more UEs on an access link and may appear as a base station to the UE(s). However, the relay station typically cannot transmit and receive on the same frequency channel at the same time. Hence, the backhaul link and the access link may be time division multiplexed. Furthermore, the system may have certain requirements that may impact the operation of the relay station. It may be desirable to efficiently support data transmission via the relay station in light of its transmit/receive limitation as well as other system requirements.

SUMMARY

Techniques for supporting data transmission via a relay station in a wireless communication system are described herein. To support relay operation, some of the available subframes for the downlink may be allocated to a backhaul downlink, and the remaining subframes may be allocated to an access downlink. Similarly, some of the available subframes for the uplink may be allocated to a backhaul uplink, and the remaining subframes may be allocated to an access uplink. The relay station may transmit or receive on each link in the subframes allocated for that link. The relay station may need to transmit on the access downlink in certain subframes and to receive on the backhaul downlink in certain other subframes. These requirements may limit which subframes can be used to send or receive data and which subframes can be used to receive or send acknowledgement (ACK) information for the data.

In an aspect, data transmission via the relay station may be supported by using ACK-and-suspend. A transmitter station may send a first transmission of a packet to a receiver station. Either the transmitter station or the receiver station may be the relay station. The transmitter station may receive no ACK information for the first transmission of the packet. This may result from (i) the receiver station not sending ACK information due to no opportunity to send the ACK information or (ii) the receiver station sending the ACK information but the transmitter station having no opportunity to receive the ACK information. In any case, the transmitter station may suspend transmission of the packet. The transmitter station may thereafter receive an indication to resume transmission of the packet and, in response, may send a second transmission of the packet to the receiver station.

In another aspect, data transmission via the relay station may be supported by using a different ACK timeline when applicable. The transmitter station may send a first transmission of a packet to the receiver station in a first subframe. The transmitter station may receive ACK information for the first transmission of the packet in a second subframe if it is available for use or in a third subframe if the second subframe is not available. The transmitter station may then send a second transmission of the packet to the receiver station in a fourth subframe in response to the ACK information.

In yet another aspect, data transmission via the relay station may be supported by using ACK repetition. The transmitter station may send a first transmission of a packet to the receiver station. The transmitter station may receive ACK information for the first transmission of the packet from the receiver station. The receiver station may send the ACK information in multiple subframes to facilitate reception of the ACK information by the transmitter station when the transmitter station is unable to receive one or more of the multiple subframes. The transmitter station may send a second transmission of the packet to the receiver station in response to the ACK information.

Various other aspects and features of the disclosure are described in further detail below.

BRIEF DESCRIPTION OF THE DRAWINGS

FIGS. 6A and 6B show two exemplary backhaul-access partitions for the downlink and uplink.

FIGS. 14 and 15 show a process and an apparatus, respectively, for data transmission with a different ACK timeline when applicable.

FIGS. 16 and 17 show a process and an apparatus, respectively, for data transmission with ACK repetition.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
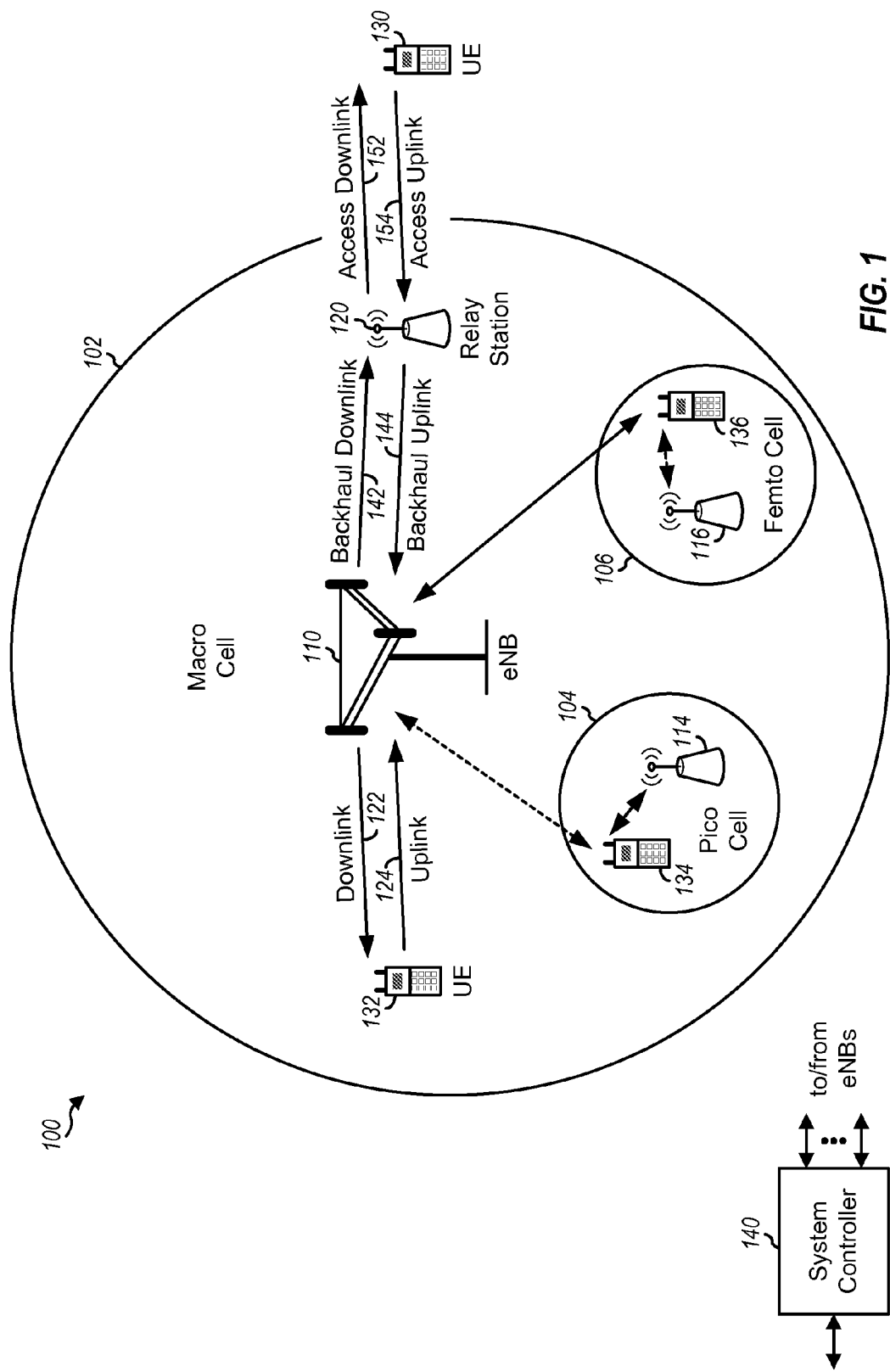
FIG. 1 shows a wireless communication system.

FIG. 1 shows a wireless communication system 100, which may be an LTE system or some other wireless system. System 100 may include a number of evolved Node Bs (eNBs), relay stations, and other system entities that can support communication for a number of UEs. An eNB may be a station that communicates with the UEs and may also be referred to as a base station, a Node B, an access point, etc. An eNB may provide communication coverage for a particular geographic area. In 3GPP, the term "cell" can refer to a coverage area of an eNB and/or an eNB subsystem serving this coverage area, depending on the context in which the term is used. An eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB. In FIG. 1, an eNB 110 may be a macro eNB for a macro cell 102, an eNB 114 may be a pico eNB for a pico cell 104, and an eNB 116 may be a femto eNB for a femto cell 106. A system controller 140 may couple to a set of eNBs and may provide coordination and control for these eNBs.

A relay station 120 may be a station that receives a transmission of data and/or other information from an upstream station (e.g., eNB 110 or UE 130) and sends a transmission of the data and/or other information to a downstream station (e.g., UE 130 or eNB 110). A relay station may also be referred to as a relay, a relay eNB, etc. A relay station may also be a UE that relays transmissions for other UEs. In FIG. 1, relay station 120 may communicate with both eNB 110 and UE 130 in order to facilitate communication between eNB 110 and UE 130.

UEs 130, 132, 134 and 136 may be dispersed throughout the system, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with eNBs and/or relay stations on the downlink and uplink. The downlink (or forward link) refers to the communication link from an eNB to a relay station or from an eNB or a relay station to a UE. The uplink (or reverse link) refers to the communication link from the UE to the eNB or relay station or from the relay station to the eNB. In FIG. 1, UE 132 may communicate with macro eNB 110 via a downlink 122 and an uplink 124 and may be referred to as a macro UE. UE 130 may communicate with relay station 120 via an access downlink 152 and an access uplink 154. Relay station 120 may communicate with eNB 110 via a backhaul downlink 142 and a backhaul uplink 144.

In general, an eNB may communicate with any number of UEs and any number of relay stations. Similarly, a relay station may communicate with any number of eNBs and any number of UEs. For simplicity, much of the description below is for communication between eNB 110 and UE 130 via relay station 120.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

The system may utilize frequency division duplexing (FDD) or time division duplexing (TDD). For FDD, the downlink and uplink are allocated separate frequency channels. Downlink transmissions and uplink transmissions may be sent concurrently on the two frequency channels. For TDD, the downlink and uplink share the same frequency channel. Downlink and uplink transmissions may be sent on the same frequency channel in different time intervals.

Figure 2:
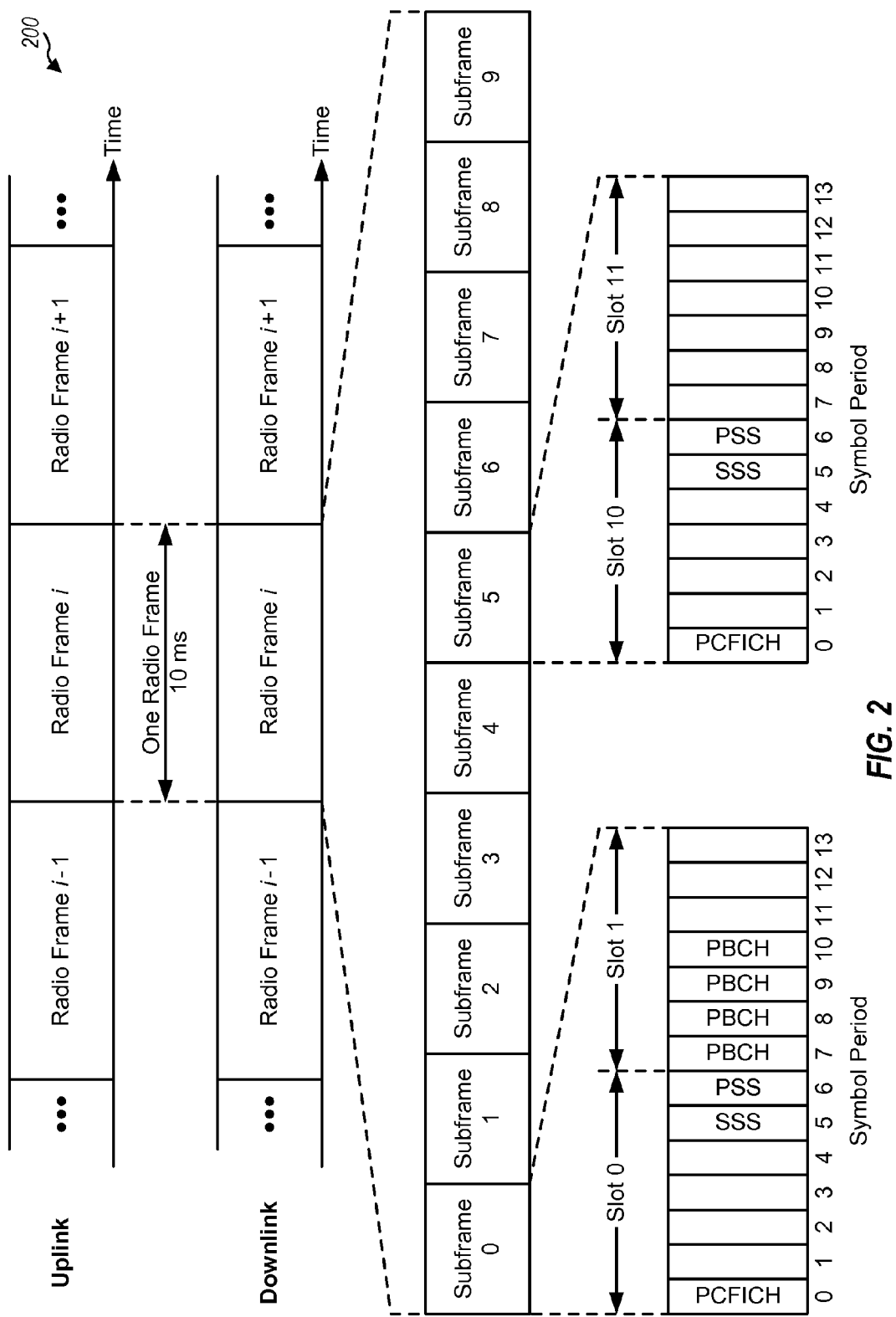
FIG. 2 shows an exemplary frame structure.

FIG. 2 shows a frame structure 200 used for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1. On the downlink, an OFDM symbol may be sent in each symbol period of a subframe. On the uplink, an SC-FDMA symbol may be sent in each symbol period of a subframe.

On the downlink in LTE, eNB 110 may transmit a primary synchronization signal (PSS) and a secondary synchronization signal (SSS) in the center 1.08 MHz of the system bandwidth for each cell in the eNB. The PSS and SSS may be sent in symbol periods 6 and 5, respectively, in subframes 0 and 5 of each radio frame with the normal cyclic prefix, as shown in FIG. 2. The PSS and SSS may be used by UEs and relay stations for cell search and acquisition. eNB 110 may transmit a Physical Broadcast Channel (PBCH) in symbol periods 0 to 3 in slot 1 of subframe 0 in certain radio frames. The PBCH may carry some system information.

eNB 110 may transmit a Physical Control Format Indicator Channel (PCFICH) in the first symbol period of each subframe, as shown in FIG. 2. The PCFICH may convey the number of symbol periods (M) used for control channels in a subframe, where M may be equal to 1, 2, 3 or 4 and may change from subframe to subframe. eNB 110 may transmit a Physical HARQ Indicator Channel (PHICH) and a Physical Downlink Control Channel (PDCCH) in the first M symbol periods of each subframe (not shown in FIG. 2). The PHICH may carry information to support hybrid automatic retransmission (HARQ). The PDCCH may carry information for resource allocation for UEs and control information for downlink channels. The first M OFDM symbols of the subframe may be referred to as TDM control symbols. A TDM control symbol may be an OFDM symbol carrying control information. eNB 110 may transmit a Physical Downlink Shared Channel (PDSCH) in the remaining symbol periods of each subframe. The PDSCH may carry data for UEs scheduled for data transmission on the downlink.

The various signals and channels in LTE are described in 3GPP TS 36.211, entitled "Evolved Universal Terrestrial Radio Access (E-UTRA); Physical Channels and Modulation," which is publicly available. Frame structure 200 is also described in 3GPP TS 36.211.

Relay station 120 may be required to transmit the PSS, SSS and PBCH to its UEs in subframes 0 and 5 of each radio frame. Relay station 120 may also detect for the PSS, SSS and PBCH from eNBs in subframes 0 and 5. Relay station 120 may not be able to simultaneously transmit to its UEs on the access link and listen to eNBs on the backhaul link. The timing of relay station 120 may be offset (e.g., delayed or advanced) by an integer number of subframes relative to the timing of the eNBs. The subframe offset may allow relay station 120 to transmit the PSS, SSS and PBCH to its UEs and to receive the PSS, SSS and PBCH from the eNBs.

Figure 3:
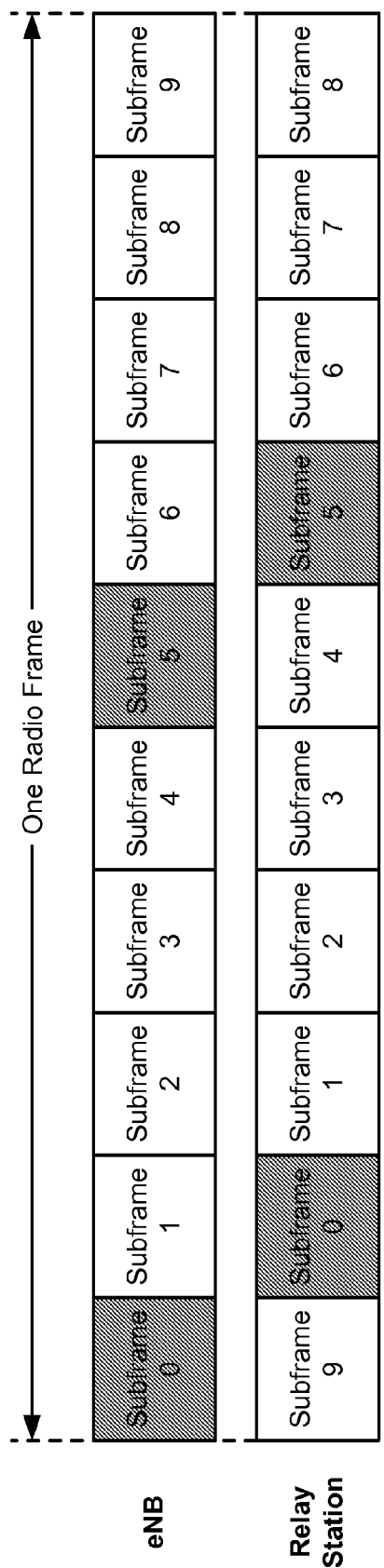
FIG. 3 shows subframe timing offset between a base station and a relay station.

FIG. 3 shows a design of subframe timing offset between eNB 110 and relay station 120. In the design shown in FIG. 4, the timing of relay station 120 may be delayed by one subframe from the timing of eNB 110. eNB 110 may transmit the PSS, SSS and PBCH in its subframes 0 and 5, which may correspond to subframes 9 and 4, respectively, of relay station 120. Relay station 120 may transmit the PSS, SSS and PBCH in its subframes 0 and 5, which may correspond to subframes 1 and 6, respectively, of the eNB 110. The subframes of eNB 110 may be referred to as eNB subframes. The subframes of relay station 120 may be referred to as relay subframes. In FIG. 3, eNB subframe 0 corresponds to relay subframe 9, and relay subframe 0 corresponds to eNB subframe 1. In general, eNB subframe q may correspond to relay subframe t, where t=q with no subframe timing offset between eNB 110 and relay station 120 and t≠q with subframe timing offset.

Figure 4:
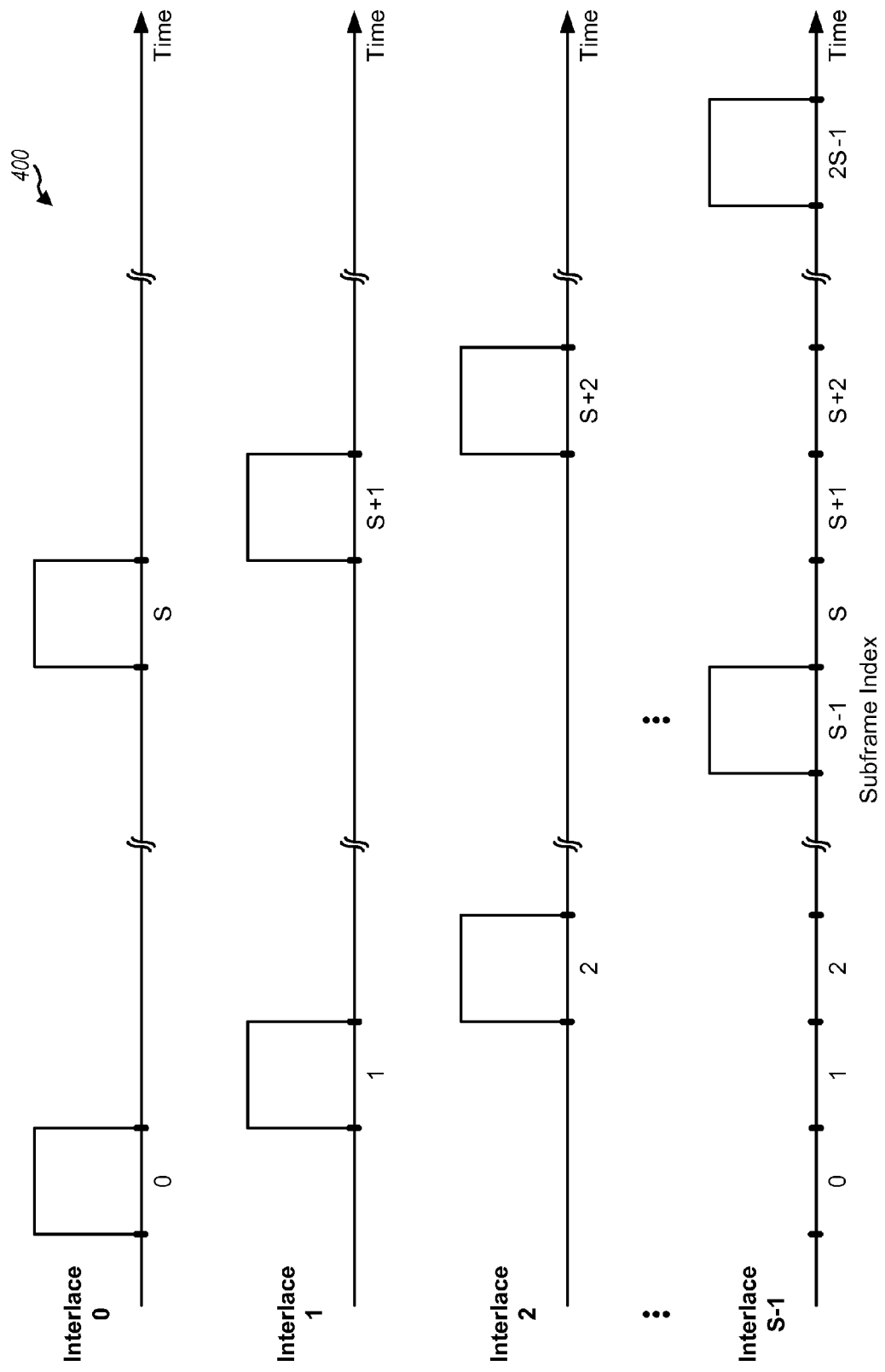
FIG. 4 shows an exemplary interlace structure.

FIG. 4 shows an exemplary interlace structure 400, which may be used for each of the downlink and uplink. As shown in FIG. 4, S interlaces with indices of 0 through S−1 may be defined, where S may be equal to 6, 8, 10, or some other value. Each interlace may include subframes that are spaced apart by S frames. In particular, interlace s may include subframes s, s+S, s+2S, etc., where s ∈ {0, ..., S−1}. The interlaces may also be referred to as HARQ interlaces.

The system may support HARQ for data transmission on the downlink and uplink. For HARQ, a transmitter may send one or more transmissions of a packet until the packet is decoded correctly by a receiver or some other termination condition is encountered. A modulation and coding scheme (MCS) may be selected for the packet such that it can be decoded correctly with high probability after a particular number of transmissions, which may be referred to as a target termination. For synchronous HARQ, all transmissions of the packet may be sent in subframes of a single interlace. For asynchronous HARQ, each transmission of the packet may be sent in any subframe.

Figure 5A:
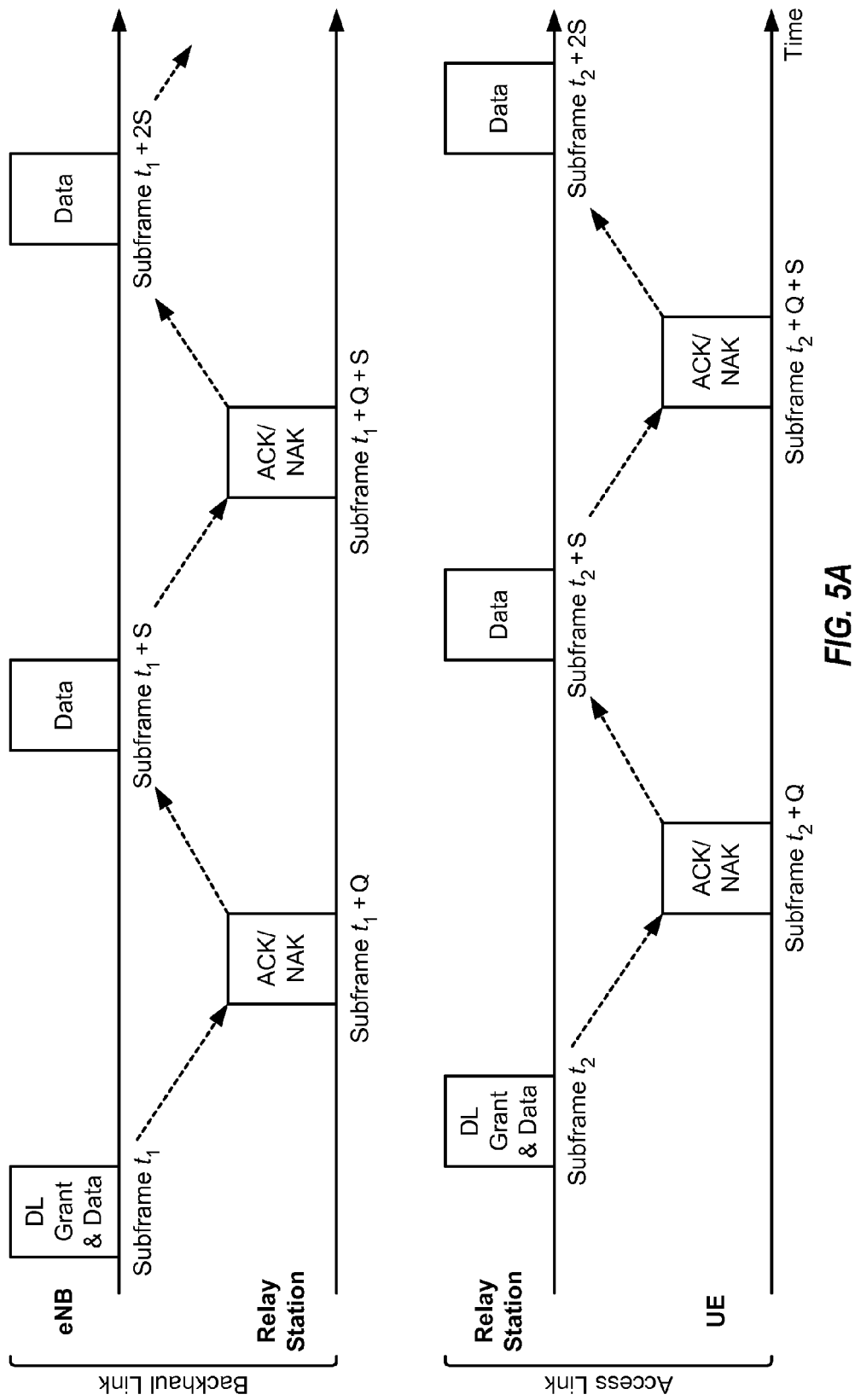
FIG. 5A shows data transmission on the downlink via a relay station.

FIG. 5A shows data transmission on the downlink with HARQ via relay station 120. eNB 110 may have data to send to UE 130 and may schedule UE 130 for data transmission on the downlink. eNB 110 may send a downlink (DL) grant and data on the backhaul link in subframe $t_1$. The downlink grant or assignment may indicate the assigned resources, the selected MCS, etc. Relay station 120 may receive the downlink grant and data transmission from eNB 110 and may process the data transmission in accordance with the downlink grant. Depending on the decoding result, relay station 120 may send an acknowledgement (ACK) or a negative acknowledgement (NAK) in subframe $t_1+Q$, where Q is the delay for an HARQ response. eNB 110 may send another transmission of the data in subframe $t_1+S$ if a NAK is received and may send new data if an ACK is received. Data transmission by eNB 110 and ACK/NAK feedback by relay station 120 on the backhaul link may continue in similar manner.

For the access link, relay station 120 may send a downlink grant and data in subframe $t_2$, which may be offset from subframe $t_1$ by a suitable amount. For example, subframe $t_2$ may be a subframe in which relay station 120 has successfully decoded the data intended for UE 130 from eNB 110. UE 130 may receive the downlink grant and data transmission from relay station 120, process the data transmission in accordance with the downlink grant, and send an ACK or a NAK in subframe $t_2+Q$. Relay station 120 may send another transmission of the data in subframe $t_2+S$ if a NAK is received and may send new data if an ACK is received. Data transmission by relay station 120 and ACK/NAK feedback by UE 130 on the access link may continue in similar manner.

Figure 5B:
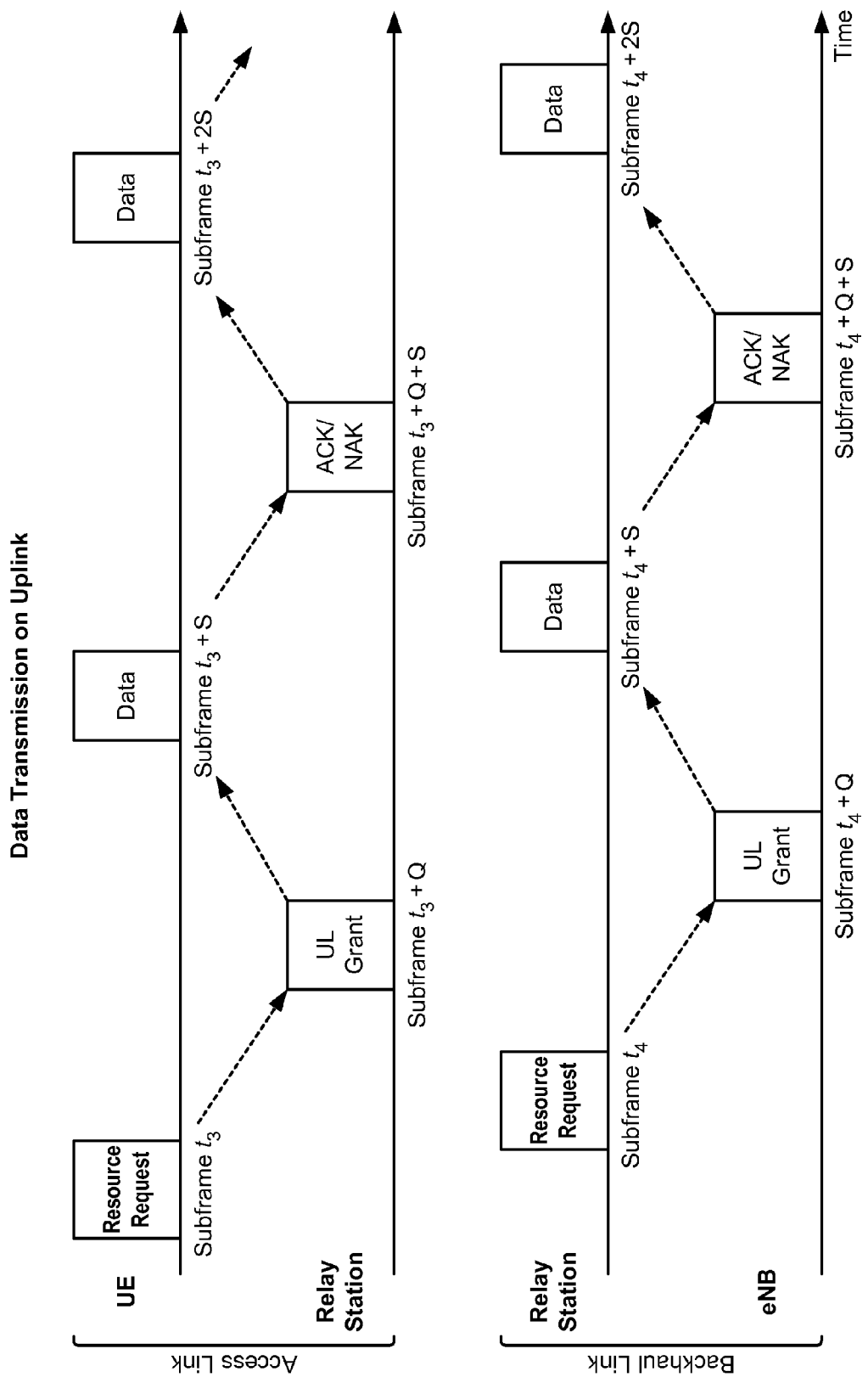
FIG. 5B shows data transmission on the uplink via a relay station.

FIG. 5B shows data transmission on the uplink with HARQ via relay station 120. UE 130 may have data to send on the uplink and may send a resource request in subframe $t_3$. Relay station 120 may receive the resource request, schedule UE 130 for data transmission on the uplink, and send an uplink (UL) grant in subframe $t_3+Q$. There may or may not be a fixed timing relationship between the resource request and the uplink grant. UE 130 may send a transmission of data in accordance with the uplink grant in subframe $t_3+S$. Relay station 120 may process the data transmission from UE 130 and, depending on the decoding result, may send an ACK or a NAK in subframe $t_3+Q+S$. UE 130 may send another transmission of the data in subframe $t_3+2S$ if a NAK is received and may send new data if an ACK is received. Data transmission by UE 130 and ACK/NAK feedback by relay station 120 on the access link may continue in similar manner.

For the backhaul link, relay station 120 may send a resource request in subframe $t_4$. eNB 110 may receive the resources request, schedule relay station 120 for data transmission on the uplink, and send an uplink grant in subframe $t_4+Q$. Relay station 120 may send a transmission of data in accordance with the uplink grant in subframe $t_4+S$. eNB 110 may process the data transmission from relay station 120 and may send an ACK or a NAK in subframe $t_4+Q+S$. Relay station 120 may send another transmission of the data or send new data in subframe $t_4+2S$ depending on whether ACK or NAK was received. Data transmission by relay station 120 and ACK/NAK feedback by eNB 110 on the backhaul link may continue in similar manner.

For FDD in LTE, S may be equal to 8, and Q may be equal to 4. For TDD in LTE, S may be equal to 10, and Q may be variable and dependent on a selected downlink-uplink configuration. S and Q may be equal to other values. For clarity, much of the description below assumes S=8 and Q=4.

LTE supports asynchronous HARQ on the downlink and synchronous HARQ on the uplink. For synchronous HARQ (e.g., as shown in FIGS. 5A and 5B), data may be sent in evenly spaced subframes in an interlace. A transmission of data may be sent in subframe t, ACK information may be sent at a fixed offset Q from the subframe used to send data, and another transmission of data may be sent in a specific subframe, e.g., subframe t+8. Synchronous HARQ may thus restrict which subframes can be used to send transmissions of data as well as ACK information. For asynchronous HARQ, data may be sent in any subframe, ACK information may be sent at a fixed offset from the subframe used to send data, and another transmission of data may be sent in any subframe. Asynchronous HARQ may thus provide flexibility in sending transmissions of data and ACK information.

A number of HARQ processes may be defined for each link. An HARQ process may carry all transmissions of a packet on a given interlace until the packet is decoded correctly and may then carry transmissions of another packet. A new packet may be sent on an HARQ process when that process becomes available.

Relay station 120 typically cannot transmit and receive on the same frequency channel at the same time. Hence, some of the available subframes for the downlink may be allocated for the backhaul link and may be referred to as backhaul downlink subframes. The remaining subframes may be allocated for the access link and may be referred to as access downlink subframes. Similarly, some of the available subframes for the uplink may be allocated for the backhaul link and may be referred to as backhaul uplink subframes. The remaining subframes may be allocated for the access link and may be referred to as access uplink subframes. The subframes may be allocated in various manners.

FIG. 6A shows an exemplary partitioning of eight available interlaces to the backhaul link and the access link. In the example shown in FIG. 6A, for the downlink, interlaces 0 and 1 may be used for the backhaul link, and interlaces 2 to 7 may be used for the access link. For the uplink, interlaces 4 and 5 may be used for the backhaul link, and interlaces 0 to 3, 6 and 7 may be used for the access link. As shown in FIG. 6A, the interlaces for the backhaul downlink and uplink may be paired to facilitate transmission of data and ACK information. In particular, downlink interlace 0 may be paired with uplink interlace 4, and downlink interlace 1 may be paired with uplink interlace 5. Each pair of interlaces may support transmission of data in one direction and ACK information in the other direction.

FIG. 6A shows an example of partitioning the eight available interlaces to the backhaul link and the access link. The partitioning may be interrupted to an extent due to the presence of subframes 0, 4, 5 and 9, which may have to be used for the access downlink.

Figure 6B:
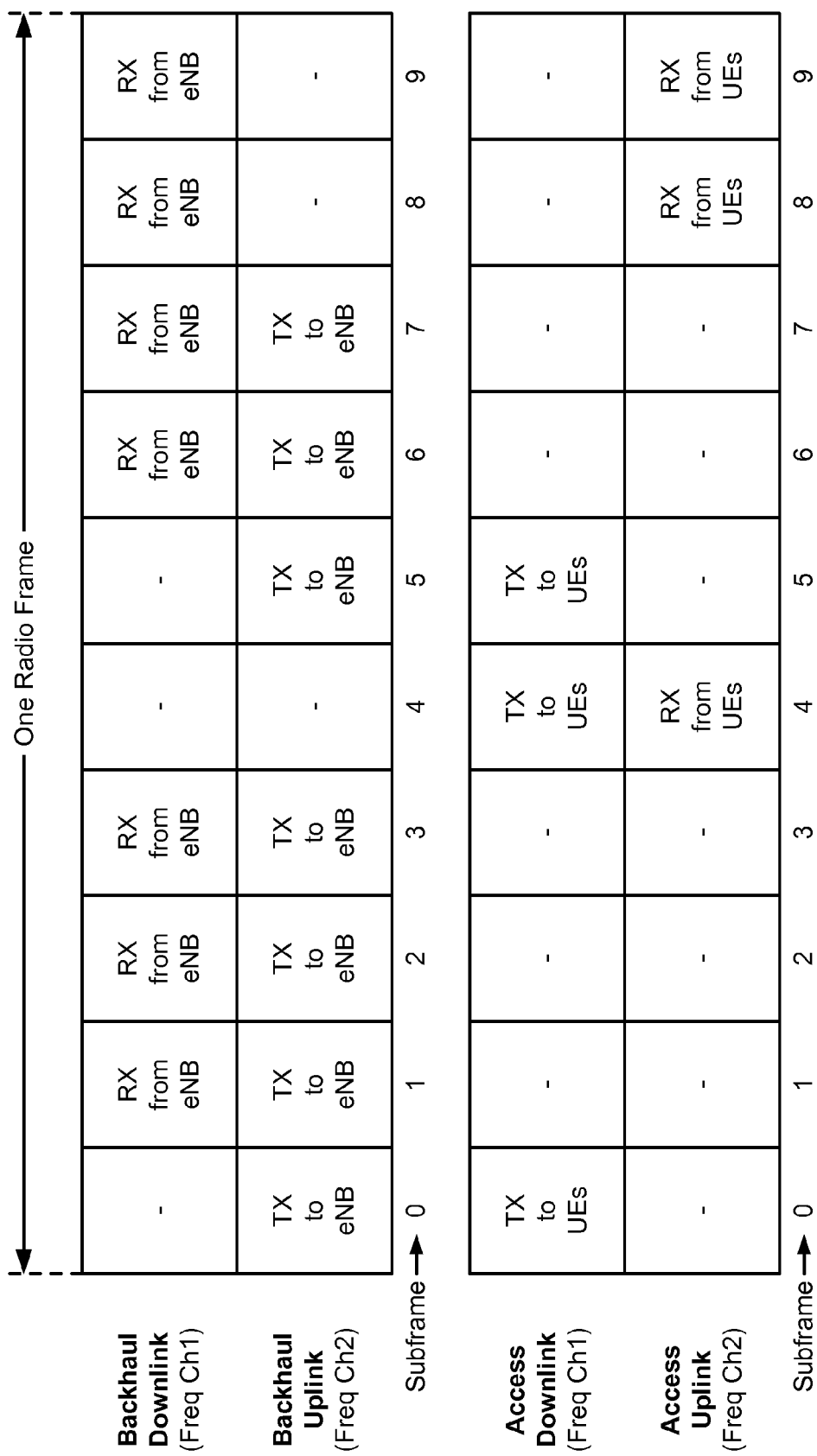

FIG. 6B shows an exemplary partitioning of the available subframes in each radio frame to the backhaul link and the access link. In the example shown in FIG. 6B, for the downlink, subframes 0, 4 and 5 (based on the timing of relay station 120) may be used for the access link, and the remaining subframes 1 to 3 and 6 to 9 may be used for the backhaul link. For the uplink, subframes 4, 8 and 9 may be used for the access link, and subframes 0 to 3 and 5 to 7 may be used for the backhaul link.

FIGS. 6A and 6B show two exemplary backhaul-access partitions for the downlink and uplink. FIG. 6A is based on 8 ms timeline for HARQ whereas FIG. 6B is based on 10 ms timeline for radio frame. In general, any set of downlink subframes and uplink subframes may be used for the backhaul link. These subframes may belong in one or more interlaces (as shown in FIG. 6A), or in a radio frame (as shown in FIG. 6B), or may be selected in any manner The number of downlink subframes may or may not match the number of uplink subframes. The remaining subframes or interlaces may be used for the access link.

In one design, relay station 120 may configure the backhaul downlink subframes as blank subframes on the access link. A blank subframe may include no transmissions, i.e., no reference signal, no control information, and no data. Relay station 120 may transmit nothing on the access link in each blank subframe in order to listen to eNB 110 on the backhaul link. In another design, relay station 120 may configure the backhaul downlink subframes as multicast/broadcast single frequency network (MBSFN) subframes on the access link. An MBSFN subframe may carry limited reference signal, limited control information, and possibly no data. In general, relay station 120 may transmit as little as possible in each backhaul downlink subframe in order to listen to eNB 110 on the backhaul downlink. Relay station 120 may transmit nothing, or only reference signal, or both reference signal and limited control information, or some other combination of transmissions in each backhaul downlink subframe. The MBSFN subframes and/or the blank subframes may be constrained to a periodicity of 10 ms. In this case, backhaul-access partitions based on 10 ms timeline may be used, e.g., as shown in FIG. 6B.

Relay station 120 may be required to transmit the PSS, SSS and PBCH to its UEs in its subframes 0 and 5 of each radio frame. Relay station 120 may not be able to receive from eNB 110 in backhaul downlink subframes that coincide with relay subframes 0 and 5. Relay station 120 may also detect for the PSS, SSS and PBCH from eNBs in their subframes 0 and 5. Relay station 120 may not be able to transmit to its UEs in access downlink subframes that coincide with eNB subframes 0 and 5. Relay subframes 0 and 5 may or may not be time aligned with eNB subframes 0 and 5, depending on whether or not the subframe timing of relay station 120 is aligned with the subframe timing of the eNBs. In any case, the requirements for relay station 120 to transmit the PSS, SSS and PBCH to its UEs in relay subframes 0 and 5 and to receive the PSS, SSS and PBCH from eNBs in eNB subframes 0 and 5 may impact data transmission with HARQ.

For data transmission on the backhaul downlink with asynchronous HARQ, eNB 110 may not be able to transmit data to relay station 120 in backhaul downlink subframes that coincide with relay subframes 0 and 5, since relay station 120 may transmit the PSS, SSS and PBCH to its UEs in these subframes. eNB 110 may transmit data to its UEs or to other relay stations with other timing offset in these backhaul downlink subframes. This may be possible because asynchronous HARQ is used for the downlink in LTE. eNB 110 may be able to efficiently use these backhaul downlink subframes.

For data transmission on the access downlink with asynchronous HARQ, relay station 120 may not be able to transmit data to UE 130 in access downlink subframes that coincide with eNB subframes 0 and 5, since relay station 120 may receive the PSS, SSS and PBCH from the eNBs in these subframes. Relay station 120 may transmit data to UE 130 in some other access downlink subframe, which is possible because asynchronous HARQ is used for the downlink in LTE.

For data transmission on the backhaul uplink with synchronous HARQ, relay station 120 may transmit data to eNB 110 in backhaul uplink subframes that coincide with relay subframe −4 (i.e., 6) or 1 but may not be able to receive ACK information sent by eNB 110 in relay subframe 0 or 5. Relay station 120 may need to transmit the PSS, SSS and PBCH to its UEs in relay subframe 0 or 5. In one design, eNB 110 may schedule relay station 120 such that a packet is not expected to terminate in relay subframe −4 or 1. Relay station 120 may then send another transmission of the packet in relay subframe 4 or 8 without receiving the ACK information from eNB 110 in relay subframe 0 or 5. In another design, eNB 110 may reduce the amount of resources assigned to relay station 120 in relay subframes −4 and 1 and may re-assign the resources to macro UEs communicating with eNB 110.

For data transmission on the access uplink with synchronous HARQ, UE 130 may transmit data to relay station 120 in access uplink subframes that coincide with eNB subframe −4 or 1 and may not receive ACK information from relay station 120 in eNB subframe 0 or 5. Relay station 120 may receive the PSS, SSS and PBCH from the eNBs in eNB subframe 0 or 5. Relay station 120 may schedule UE 130 such that a packet is not expected to terminate in eNB subframe −4 or 1 or may reduce the amount of resources assigned to UE 130 in eNB subframes −4 and 1. In general, relay station 120 may not listen to UE 130 in some subframes for various reasons.

In an aspect, ACK-and-suspend may be used to mitigate lack of ACK opportunities. An ACK opportunity may correspond to both a transmitter being able to send ACK information and a receiver being able to receive the ACK information in a subframe in which the ACK information can be sent, e.g., due to a fixed data-to-ACK delay. ACK-and-suspend may be used for synchronous HARQ, as described below. ACK-and-suspend may also be used for asynchronous HARQ.

Figure 7:
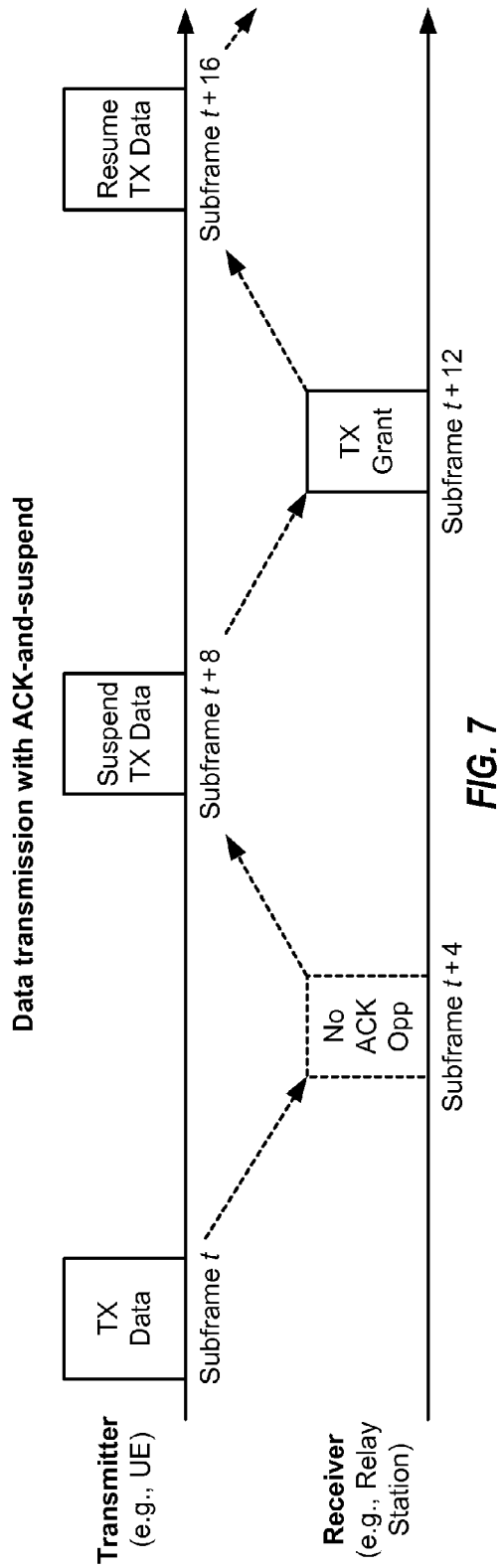
FIG. 7 shows data transmission with ACK-and-suspend.

FIG. 7 shows a design of data transmission with ACK-and-suspend for synchronous HARQ. For the access uplink, UE 130 may be a transmitter, and relay station 120 may be a receiver (as shown in FIG. 7). For the backhaul uplink, relay station 120 may be a transmitter, and eNB 110 may be a receiver (not shown in FIG. 7).

The transmitter may send a transmission of a packet in subframe t. The receiver may receive and decode the transmission of the packet. However, no ACK opportunity may be present in subframe t+4 for the transmission of the packet sent in subframe t. For data transmission on the access uplink, subframe t+4 may correspond to eNB subframe 0 or 5. The receiver/relay station 120 may be listening on the backhaul link for the PSS, SSS and PBCH and may be unable to transmit ACK information in subframe t+4. For data transmission on the backhaul uplink, subframe t+4 may correspond to relay subframe 0 or 5. The transmitter/relay station 120 may be transmitting the PSS, SSS and PBCH to its UEs and may be unable to receive ACK information in subframe t+4. In either case, no ACK opportunity may be available in subframe t+4 due to the receiver not being able to send ACK information or the transmitter not being able to receive the ACK information.

The transmitter may treat the missing ACK information in subframe t+4 as an implicit ACK and may suspend its transmission of the packet starting in subframe t+8. However, the transmitter does not discard the packet. If the receiver decoded the packet in error, then the receiver can subsequently schedule another transmission of the packet in a subframe in which the receiver can send an uplink grant, and the suspension due to the implicit ACK may be revoked. In the example shown in FIG. 7, the receiver may send an uplink grant with an indication to continue transmitting the packet in subframe t+12. The transmitter may receive the uplink grant and may send another transmission of the packet in subframe t+16. Conversely, if the receiver decoded the packet correctly, then the receiver can schedule transmission of another packet in a subframe in which the receiver can send an uplink grant. In the example shown in FIG. 7, the receiver may send an uplink grant with an indication to transmit a new packet in subframe t+12. The transmitter may receive the uplink grant, discard the packet sent in subframe t, and send a transmission of a new packet in subframe t+16.

ACK-and-suspend may be used for the access uplink, as shown in FIG. 7. UE 130 may send a transmission of a packet. Relay station 120 may be unable to send ACK information for this transmission, e.g., because relay station 120 is listening on the backhaul link. UE 130 may treat the missing ACK information as an implicit ACK and may suspend its transmission of the packet. However, UE 130 does not discard the packet. If relay station 120 decodes the packet in error, then relay station 120 can schedule another transmission of the packet on the access uplink, and the suspension due to the implicit ACK may be revoked.

ACK-and-suspend may also be used for the backhaul uplink. Relay station 120 may send a transmission of a packet to eNB 110 but may not be able to receive ACK information from eNB 110, e.g., because relay station 120 is transmitting to its UEs on the access link. Relay station 120 may treat the missing ACK information as an implicit ACK but may not discard the packet. If eNB 110 decoded the packet in error, then eNB 110 can schedule relay station 120 to send another transmission of the packet on the backhaul uplink, and the suspension due to the implicit ACK may be revoked.

ACK-and-suspend may be used for data transmission on the uplink, as described above. In this case, the receiver (e.g., eNB 110 or relay station 120) may send an uplink grant and/or other information to resume transmission. ACK-and-suspend may also be used for data transmission on the downlink. In this case, the receiver (e.g., relay station 120 or UE 130) may send delayed ACK information and/or other information to resume transmission.

ACK-and-suspend may be used when there is no opportunity to transmit and/or receive ACK information, as described above. ACK-and-suspend may also be used when there is no opportunity to send the next transmission of data. For example, for data transmission on the backhaul uplink, eNB 110 (or receiver station) may receive a first transmission of a packet from relay station 120 (or transmitter station). eNB 110 may determine that relay station 120 has no opportunity to send a second transmission of the packet. eNB 110 may then send ACK information to relay station 120 to suspend transmission of the packet. eNB 110 may thereafter reschedule transmission of the packet by relay station 120. Relay station 120 may perform the complementary processing. Relay station 120 may send the first transmission of the packet to eNB 110. Relay station 120 may receive the ACK information sent by eNB 110 to suspend transmission of the packet by relay station 120. Relay station 120 may send another transmission of the packet to eNB 110 when rescheduled by eNB 110. In general, ACK-and-suspend for no data opportunity may be used for data transmission on the backhaul downlink, the backhaul uplink, the access downlink, and the access uplink.

In another aspect, a different ACK timeline may be used when applicable, and ACK information may be sent in a different subframe when no ACK opportunity is available in a nominal ACK subframe. The data-to-ACK delay may have a nominal value of four subframes, and a nominal ACK subframe may be four subframes after a subframe in which data is sent. However, if ACK information cannot be sent or received with the nominal delay, then the data-to-ACK delay may be varied based on the available ACK opportunities.

Figure 8:
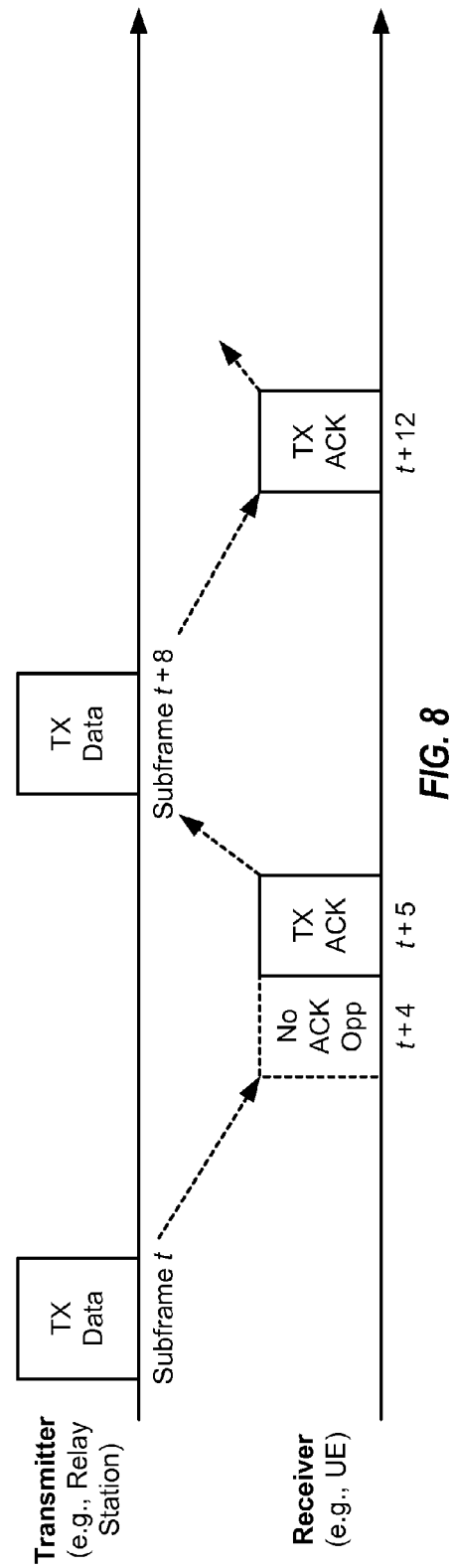
FIG. 8 shows data transmission with different ACK timeline when applicable.

FIG. 8 shows a design of data transmission with a different ACK timeline when applicable. A transmitter (e.g., relay station 120) may send a transmission of a packet in subframe t. A receiver (e.g., UE 130) may receive and decode the transmission of the packet. However, no ACK opportunity may be present in subframe t+4, e.g., due to the receiver not being able to send ACK information or the transmitter not being able to receive the ACK information.

In the example shown in FIG. 8, an ACK opportunity may be available in subframe t+5. For example, subframe t+4 may belong in one interlace (e.g., downlink interlace 0 or uplink interlace 4 in FIG. 6A) available for communication, and subframe t+5 may belong in the next interlace (e.g., downlink interlace 1 or uplink interlace 5) also available for communication. The receiver may send ACK information in subframe t+5 for the transmission of data in subframe t. The transmitter may receive the ACK information and may send another transmission of the packet or a transmission of a new packet in subframe t+8. In the example shown in FIG. 8, an ACK opportunity may be available in subframe t+12. The receiver may then send ACK information in subframe t+12 for the transmission of data in subframe t+8.

In one design, the transmitter and the receiver may both be aware of the available ACK opportunities, which may be dependent on the backhaul-access partitions for the downlink and uplink. The receiver may then send ACK information in the earliest available ACK opportunity for each transmission of data, and the transmitter may receive the ACK information during this ACK opportunity. The earliest available ACK opportunity may be zero or more subframes later than the nominal ACK subframe. In another design, the receiver (e.g., UE 130) may not be aware of which subframes the transmitter (e.g., relay station 120) will listen to and may send ACK information in each subframe starting with the nominal ACK subframe. The transmitter may be able to receive one of the ACK transmissions sent by the receiver. In another design, the transmitter (e.g., UE 130) may not be aware of which subframes the receiver (e.g., relay station 120) will send ACK information. The transmitter may then detect for ACK information in each subframe starting with the nominal ACK subframe.

Data transmission with a different ACK timeline when applicable may be used for the backhaul downlink, the backhaul uplink, the access downlink, and the access uplink. Data transmission with a different ACK timeline when applicable may also be used for synchronous HARQ and asynchronous HARQ. For synchronous HARQ, all transmissions of a packet may be sent on one interlace, but ACK information may be sent on different interlaces depending on the available ACK opportunities, e.g., as shown in FIG. 8. For asynchronous HARQ, transmissions of a packet may be sent on different interlaces, and ACK information may also be sent on different interlaces depending on the available ACK opportunities. For example, in FIG. 8, the transmitter may send another transmission of the packet in subframe t+9 or t+10 in response to the ACK information received in subframe t+5.

A certain minimum processing time may be required between a transmission of ACK information and a next transmission of data. For synchronous HARQ, the subframes in which data can be sent may be restricted to the same interlace, and the minimum processing time may restrict the subframes in which ACK information can be sent. For example, if the minimum processing time is two subframes, then ACK information may be sent in subframe t+4 or t+5 in FIG. 8. However, if the minimum processing time is one subframe, then ACK information may be sent in subframe t+4, t+5, or t+6 in FIG. 8. For asynchronous HARQ, ACK information may be sent in any subframe starting with the nominal ACK subframe, and the minimum processing time may restrict the subframes in which data can be sent. For example, if the minimum processing time is four subframes, then ACK information may be sent in subframe t+5, and another transmission of data may be sent in subframe t+9 or later.

In yet another aspect, ACK repetition may be used to facilitate reception of ACK information. A receiver may send ACK information in multiple subframes for a transmission of data by a transmitter. The transmitter may be able to receive the ACK information in one of the multiple subframes.

Figure 9:
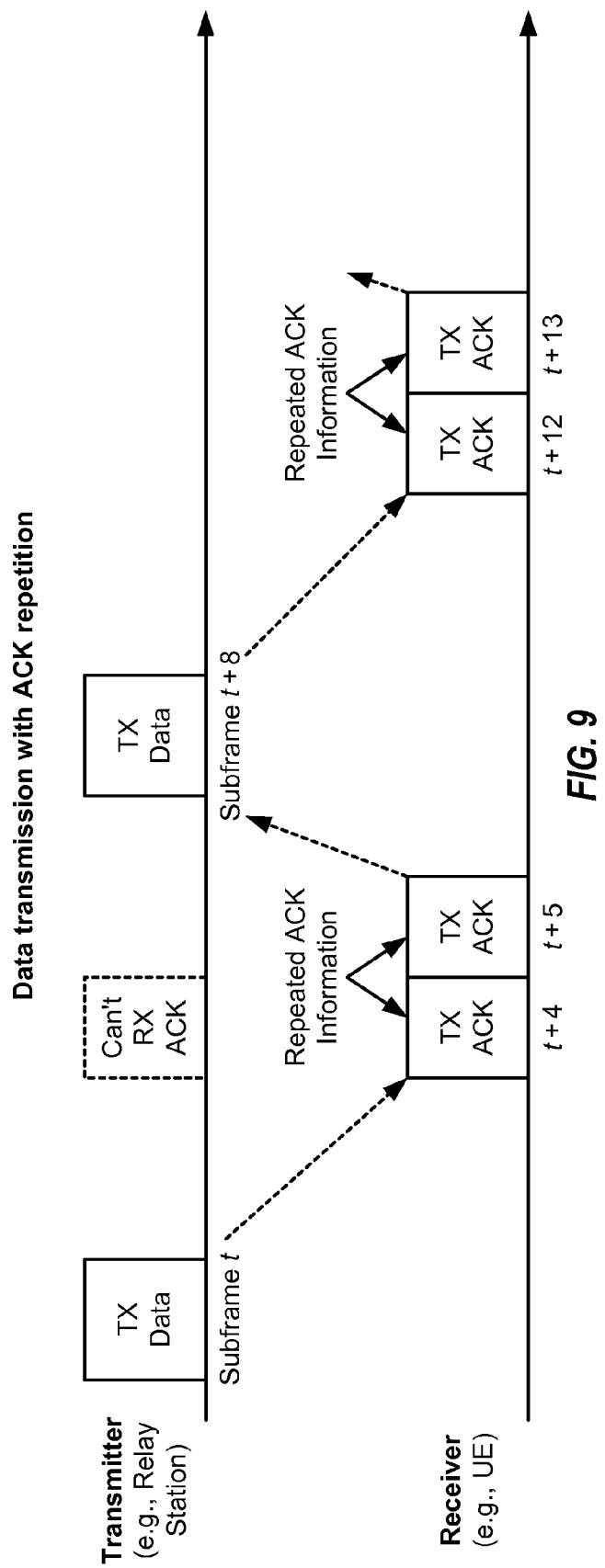
FIG. 9 shows data transmission with ACK repetition.

FIG. 9 shows a design of data transmission with ACK repetition. A transmitter (e.g., relay station 120) may send a transmission of a packet in subframe t. A receiver (e.g., UE 130) may receive and decode the transmission of the packet. The receiver may be configured to send ACK information in two consecutive subframes.

The receiver may then send ACK information in subframes t+4 and t+5. The transmitter may be unable to receive the ACK information in subframe t+4, which may be a subframe in which the transmitter is communicating on the other link. The transmitter may be able to receive the ACK information in subframe t+5. The transmitter may then send another transmission of the packet or a transmission of a new packet in subframe t+8. The receiver may send ACK information in subframes t+12 and t+13 for the transmission of data in subframe t+8.

FIG. 9 shows an example in which ACK information is sent in two consecutive subframes with ACK repetition. In general, ACK information may be repeated in any number of subframes, e.g., two, three, four, etc. The amount of repetition may be dependent on the backhaul-access partitions for the downlink and uplink. For example, ACK information may be repeated in more subframes if there are fewer subframes or interlaces allocated for communication on a particular link. The amount of repetition may be fixed for all transmissions of a packet. Alternatively, the amount of repetition may change from transmission to transmission of a packet, e.g., based on the subframes allocated for communication. ACK information may also be repeated only in subframes in which it might be received by the transmitter instead of in consecutive subframes.

ACK repetition may be used for data transmission on the backhaul downlink, the backhaul uplink, the access downlink, and the access uplink. ACK repetition may also be used for synchronous HARQ and asynchronous HARQ. ACK repetition may be used to support relay operation when only a subset of the subframes may be available for receiving ACK information. This is different than repeating ACK information in multiple subframes in order to increase the amount of energy for the ACK information by a link-limited or power-limited receiver (e.g., UE) sending the ACK information.

Relay station 120 may need to receive periodic downlink transmissions from eNB 110 and other eNBs within range. The periodic downlink transmissions may include the PSS, SSS, PBCH, and system information blocks (SIBs). A number of SIBs may be defined, and each SIB may carry a specific set of parameters to support operation by UEs. SIB 1 may carry scheduling information for system information (SI) messages as well as a mapping of SIBs to SI messages. Relay station 120 may need to receive SIB1 in order to receive SI messages for other SIBs. SIB1 may be sent by an eNB in subframe 0, 4, 5 or 9 with a periodicity of 80 ms.

Relay station 120 may detect for the PSS, SSS and PBCH in backhaul downlink subframes that correspond to eNB subframes 0 and 5 and may detect for SIB1 in backhaul downlink subframes that correspond to eNB subframes 0, 4, 5 and 9. The number of backhaul downlink subframes that correspond to eNB subframes 0, 4, 5 and 9 may be dependent on the backhaul-access partitions. Relay station 120 may detect for the PSS and SSS on a relatively slow time scale to search for potential new eNBs. The slow time scale may be acceptable if relay station 120 is stationary. Relay station 120 may also tune away during an access downlink subframe and detect for the PSS, SSS and PBCH on the backhaul downlink instead of transmitting to its UEs. The timing of relay station 120 may be offset from the timing of the eNBs to enable relay station 120 to receive the PSS, SSS, PBCH and SIB1 on the backhaul downlink and transmit the PSS, SSS, PBCH and SIB1 on the access downlink, as described above.

In one design, eNB 110 may inform relay station 120 when the PBCH and/or SIB1 will change, e.g., via paging. Upon receiving such a page, relay station 120 may stop transmitting until it has acquired new system information from eNB 110.

Relay station 120 may receive periodic uplink transmissions from UE 130 and/or may send periodic uplink transmissions to eNB 110. The periodic uplink transmissions may be for a sounding reference signal (SRS), channel quality indicator (CQI) information, etc. CQI information may include CQI, precoding matrix indicator (PMI), rank indicator (RI), and/or other information. CQI information may be sent with a periodicity of 2, 5, 10, 20, 40, 80, 160 or 320 ms. If one interlace is allocated for the access uplink, then relay station 120 may monitor for periodic uplink transmissions from UE 130 with a periodicity determined by the least common multiple of an interlace period (which may be 8 ms) and a CQI reporting period. UE 130 may be configured to send CQI information every 2 ms to ensure that relay station 120 can receive the CQI information every 8 ms with one interlace allocated for the access uplink. UE 130 may also be configured to send CQI information less frequently if more interlaces are allocated for the access uplink. For example, if four even-numbered interlaces are allocated for the access uplink, then UE 130 may send CQI information every 10 ms, and relay station 120 can receive the CQI information each time it is sent. UE 130 may also be configured to send CQI information only during access uplink subframes. For example, UE 130 may be configured to send CQI information every 2 ms but may actually send CQI information whenever a CQI reporting interval coincides with an access uplink subframe and may skip CQI reporting otherwise. Relay station 120 may also tune away from the backhaul link (e.g., skip transmitting on the backhaul uplink) in order to receive the periodic uplink transmissions on the access uplink. Similarly, on the backhaul uplink, relay station 120 may be configured to send sounding reference signal and CQI information at a suitable rate to eNB 130.

Figures 10, 11:
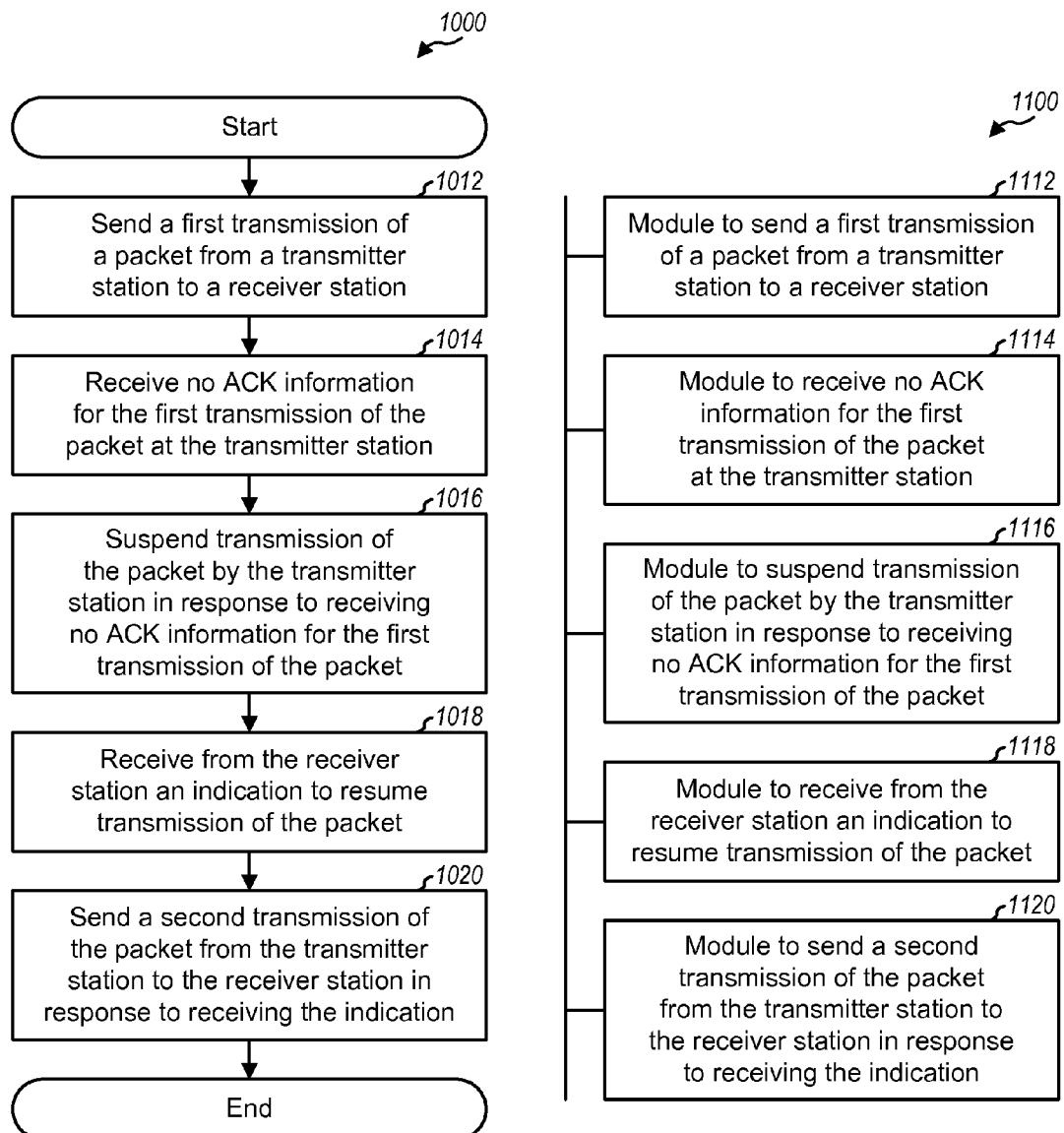
FIGS. 10 and 11 show a process and an apparatus, respectively, for transmitting data with ACK-and-suspend.

FIG. 10 shows a design of a process 1000 for transmitting data with ACK-and-suspend. Process 1000 may be performed by a transmitter station for data transmission to a receiver station. For the access uplink, the transmitter station may be a UE, and the receiver station may be a relay station. For the access downlink, the transmitter station may be a relay station, and the receiver station may be a UE. For the backhaul uplink, the transmitter station may be a relay station, and the receiver station may be a base station. For the backhaul downlink, the transmitter station may be a base station, and the receiver station may be a relay station.

The transmitter station may send a first transmission of a packet to the receiver station (block 1012). The transmitter station may receive no ACK information for the first transmission of the packet (block 1014). The transmitter station may suspend transmission of the packet in response to receiving no ACK information for the first transmission of the packet (block 1016). The transmitter station may thereafter receive, from the receiver station, an indication to resume transmission of the packet (block 1018). The indication may be a grant to resend the packet, or delayed ACK information, or some other information. The transmitter station may then send a second transmission of the packet to the receiver station in response to receiving the indication (block 1020). The first and second transmissions of the packet may be any two transmissions of the packet.

In one design of block 1014, ACK information for the first transmission of the packet may not be sent by the receiver station due to no opportunity to send the ACK information. For example, for data transmission on the access uplink, the receiver station (a relay station) may need to receive transmissions (e.g., the PSS and SSS) on the backhaul downlink during a subframe in which the ACK information is to be sent on the access downlink. In another design of block 1014, ACK information may be sent by the receiver station but may not be received by the transmitter station due to no opportunity to receive the ACK information. For example, for data transmission on the backhaul uplink, the transmitter station (a relay station) may need to send transmissions (e.g., the PSS and SSS) on the access downlink during a subframe in which the ACK information is sent on the backhaul downlink. No opportunity to send or receive the ACK information may occur due to other reasons.

For synchronous HARQ, the first and second transmissions of the packet may be sent in subframes of a first interlace, and ACK information for transmissions of the packet may be sent in subframes of a second interlace. For asynchronous HARQ, the first and second transmissions of the packet may not be restricted to subframes of an interlace.

FIG. 11 shows a design of an apparatus 1100 for transmitting data with ACK-and-suspend. Apparatus 1100 includes a module 1112 to send a first transmission of a packet from a transmitter station to a receiver station, a module 1114 to receive no ACK information for the first transmission of the packet at the transmitter station, a module 1116 to suspend transmission of the packet by the transmitter station in response to receiving no ACK information for the first transmission of the packet, a module 1118 to receive from the receiver station an indication to resume transmission of the packet, and a module 1120 to send a second transmission of the packet from the transmitter station to the receiver station in response to receiving the indication.

Figures 12, 13:
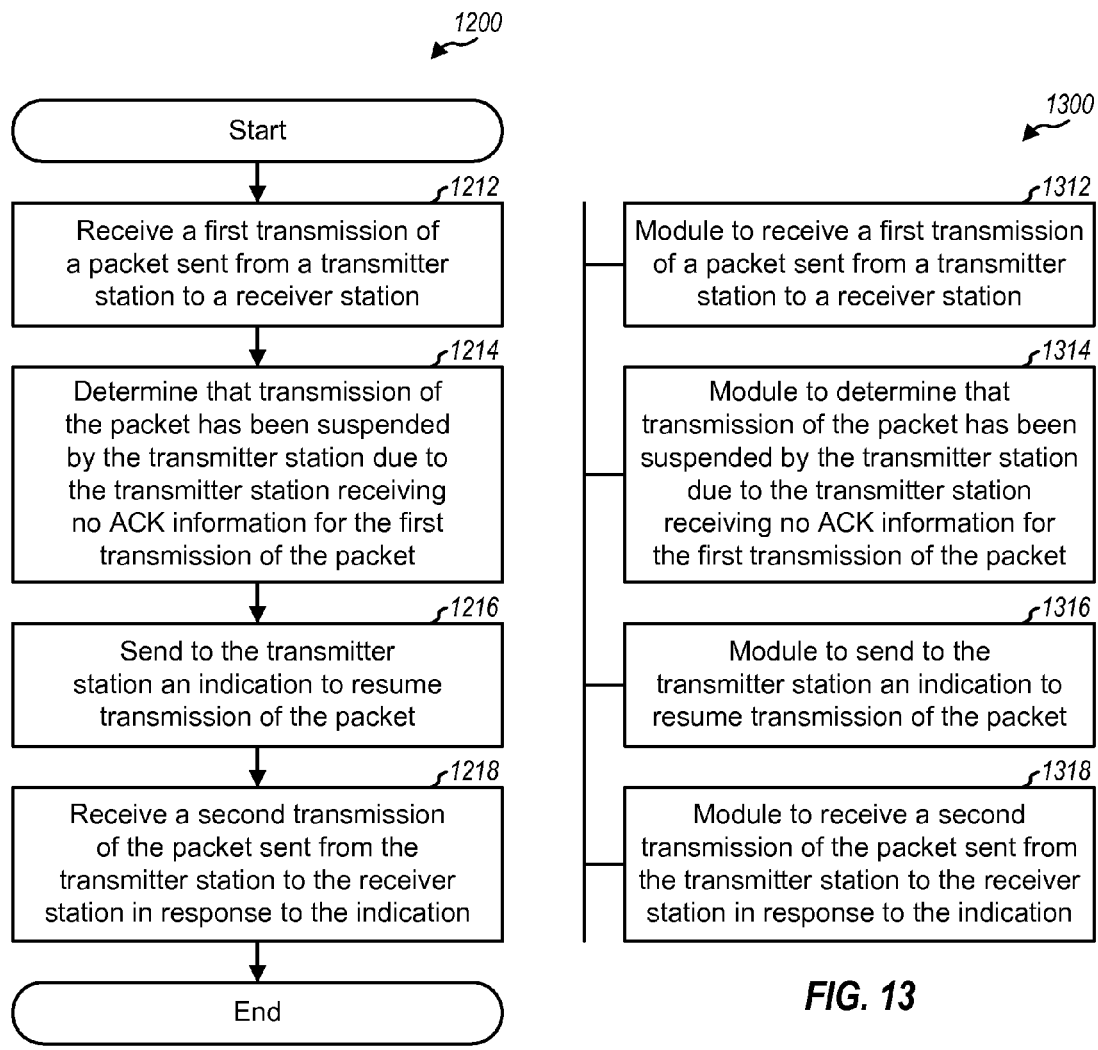
FIGS. 12 and 13 show a process and an apparatus, respectively, for receiving data with ACK-and-suspend.

FIG. 12 shows a design of a process 1200 for receiving data with ACK-and-suspend. A receiver station may receive a first transmission of a packet sent by a transmitter station (block 1212). The receiver station may determine that transmission of the packet has been suspended by the transmitter station due to the transmitter station receiving no ACK information for the first transmission of the packet (block 1214). The receiver station may send to the transmitter station an indication (e.g., a grant) to resume transmission of the packet (block 1216). The receiver station may thereafter receive a second transmission of the packet sent by the transmitter station in response to the indication (block 1218).

In one design of block 1214, the receiver station may send no ACK information for the first transmission of the packet to the transmitter station due to no opportunity to send the ACK information. The receiver station may determine that transmission of the packet has been suspended by the transmitter station based on no ACK information being sent by the receiver station. In another design of block 1214, the receiver station may send ACK information, which may not be received by the transmitter station due to no opportunity to receive the ACK information. The receiver station may determine that transmission of the packet has been suspended by the transmitter station based on no transmission of the packet being received by the receiver station in response to the ACK information. The receiver station may also determine that transmission of the packet has been suspended by the transmitter station based on other information, e.g., the backhaul-access partitions for the downlink and uplink.

In another design of receiving data with ACK-and-suspend, a receiver station (e.g., an eNB or a relay station) may receive a first transmission of a packet sent by a transmitter station (e.g., a relay station or a UE). The receiver station may determine that the transmitter station has no opportunity to send a second transmission of the packet. The receiver station may then send ACK information to the transmitter station to suspend transmission of the packet. For example, the receiver station may send ACK for the packet, even though the packet is decoded in error by the receiver station, in order to suspend transmission of the packet by the transmitter station. The receiver station may thereafter reschedule transmission of the packet by the transmitter station. The receiver station may then receive the second transmission of the packet from the transmitter station in response to the rescheduling.

In another design of transmitting data with ACK-and-suspend, a transmitter station (e.g., a UE or a relay station) may send a first transmission of a packet to a receiver station (e.g., a relay station or an eNB). The transmitter station may receive ACK information sent by the receiver station to suspend transmission of the packet by the transmitter station. The transmitter station may determine that the ACK information is intended to suspend transmission of the packet based on (i) no opportunity to send a second transmission of the packet by the transmitter station or (ii) a subsequent grant from the receiver station to send another transmission of the packet instead of a transmission of a new packet. The transmitter station may then send the second transmission of the packet to the receiver station when rescheduled by the receiver station.

FIG. 13 shows a design of an apparatus 1300 for receiving data with ACK-and-suspend. Apparatus 1300 includes a module 1312 to receive a first transmission of a packet sent from a transmitter station to a receiver station, a module 1314 to determine that transmission of the packet has been suspended by the transmitter station due to the transmitter station receiving no ACK information for the first transmission of the packet, a module 1316 to send to the transmitter station an indication to resume transmission of the packet, and a module 1318 to receive a second transmission of the packet sent from the transmitter station to the receiver station in response to the indication.

FIG. 14 shows a design of a process 1400 for data transmission with a different ACK timeline when applicable. A first transmission of a packet may be exchanged (e.g., sent or received) between a transmitter station and a receiver station in a first subframe (block 1412). The transmitter station or the receiver station may be a relay station. ACK information for the first transmission of the packet may be exchanged between the transmitter station and the receiver station in a second subframe if it is available for use (block 1414). The second subframe may be a fixed offset from the first subframe. ACK information for the first transmission of the packet may be exchanged between the transmitter station and the receiver station in a third subframe if the second subframe is not available for use (block 1416). A second transmission of the packet may be exchanged between the transmitter station and the receiver station in a fourth subframe in response to the ACK information (block 1418).

In one design, process 1400 may be performed by the transmitter station, which may be a relay station, a UE, a base station, or some other station. The transmitter station may send the first transmission of the packet in block 1412, receive the ACK information in block 1414 or 1416, and send the second transmission of the packet in block 1418. In another design, process 1400 may be performed by the receiver station, which may be a relay station, a UE, a base station, or some other station. The receiver station may receive the first transmission of the packet in block 1412, send the ACK information in block 1414 or 1416, and receive the second transmission of the packet in block 1418.

In one design, a set of subframes allocated for transmission from the receiver station to the transmitter station may be determined, e.g., based on the backhaul-access partitions for the downlink and uplink. This set of subframes may be a subset of all available subframes. Whether to exchange the ACK information in the second or third subframe may be determined based on the set of subframes allocated for transmission. For example, the second subframe may not be available for use if it is not included in the set of subframes. In this case, the third subframe may be the closest subframe after the second subframe and included in the set of subframes.

For synchronous HARQ, the first and fourth subframes may belong in a single interlace. For asynchronous HARQ, the fourth subframe may be variable and may be at least a predetermined number of subframes from the second or third subframe in which the ACK information is sent.

FIG. 15 shows a design of an apparatus 1500 for data transmission with a different ACK timeline when applicable. Apparatus 1500 includes a module 1512 to exchange (e.g., send or receive) a first transmission of a packet between a transmitter station and a receiver station in a first subframe, a module 1514 to exchange ACK information for the first transmission of the packet between the transmitter station and the receiver station in a second subframe if available for use, the second subframe being a fixed offset from the first subframe, a module 1516 to exchange ACK information for the first transmission of the packet between the transmitter station and the receiver station in a third subframe if the second subframe is not available for use, and a module 1518 to exchange a second transmission of the packet between the transmitter station and the receiver station in a fourth subframe in response to the ACK information.

FIG. 16 shows a design of a process 1600 for data transmission with ACK repetition. A first transmission of a packet may be exchanged (e.g., sent or received) between a transmitter station and a receiver station (block 1612). The transmitter station or the receiver station may be a relay station. ACK information for the first transmission of the packet may be exchanged between the transmitter station and the receiver station (block 1614). The ACK information may be sent by the receiver station in multiple subframes to facilitate reception of the ACK information by the transmitter station when the transmitter station is unable to receive one or more of the multiple subframes. A second transmission of the packet may be exchanged between the transmitter station and the receiver station in response to the ACK information (block 1616).

In one design, process 1600 may be performed by the transmitter station, which may be a relay station, a UE, a base station, etc. The transmitter station may send the first transmission of the packet in block 1612, receive the ACK information in at least one of the multiple subframes in block 1614, and send the second transmission of the packet in block 1616. In another design, process 1600 may be performed by the receiver station, which may be a relay station, a UE, a base station, etc. The receiver station may receive the first transmission of the packet in block 1612, send the ACK information in the multiple subframes in block 1614, and receive the second transmission of the packet in block 1616.

In one design, the ACK repetition may be dependent on the backhaul-access partitions for the downlink and uplink. The number of subframes to send the ACK information may be dependent on the allocation of available subframes to the backhaul downlink, the backhaul uplink, the access downlink, and the access uplink. For example, the ACK information may be sent by a UE in more subframes if fewer subframes are allocated for the access uplink, and vice versa. The number of subframes to send the ACK information may be configured for the receiver station (e.g., based on the backhaul-access partitions) and may be fixed for all transmissions of the packet. Alternatively, the number of subframes to send the ACK information may be variable for different transmissions of the packet.

FIG. 17 shows a design of an apparatus 1700 for data transmission with ACK repetition. Apparatus 1700 includes a module 1712 to exchange (e.g., send or receive) a first transmission of a packet between a transmitter station and a receiver station, a module 1714 to exchange ACK information for the first transmission of the packet between the transmitter station and the receiver station, with the ACK information being sent by the receiver station in multiple subframes to facilitate reception of the ACK information by the transmitter station when the transmitter station is unable to receive one or more of the multiple subframes, and a module 1716 to exchange a second transmission of the packet between the transmitter station and the receiver station in response to the ACK information.

The modules in FIGS. 11, 13, 15 and 17 may comprise processors, electronics devices, hardware devices, electronics components, logical circuits, memories, software codes, firmware codes, etc., or any combination thereof.

Figure 18:
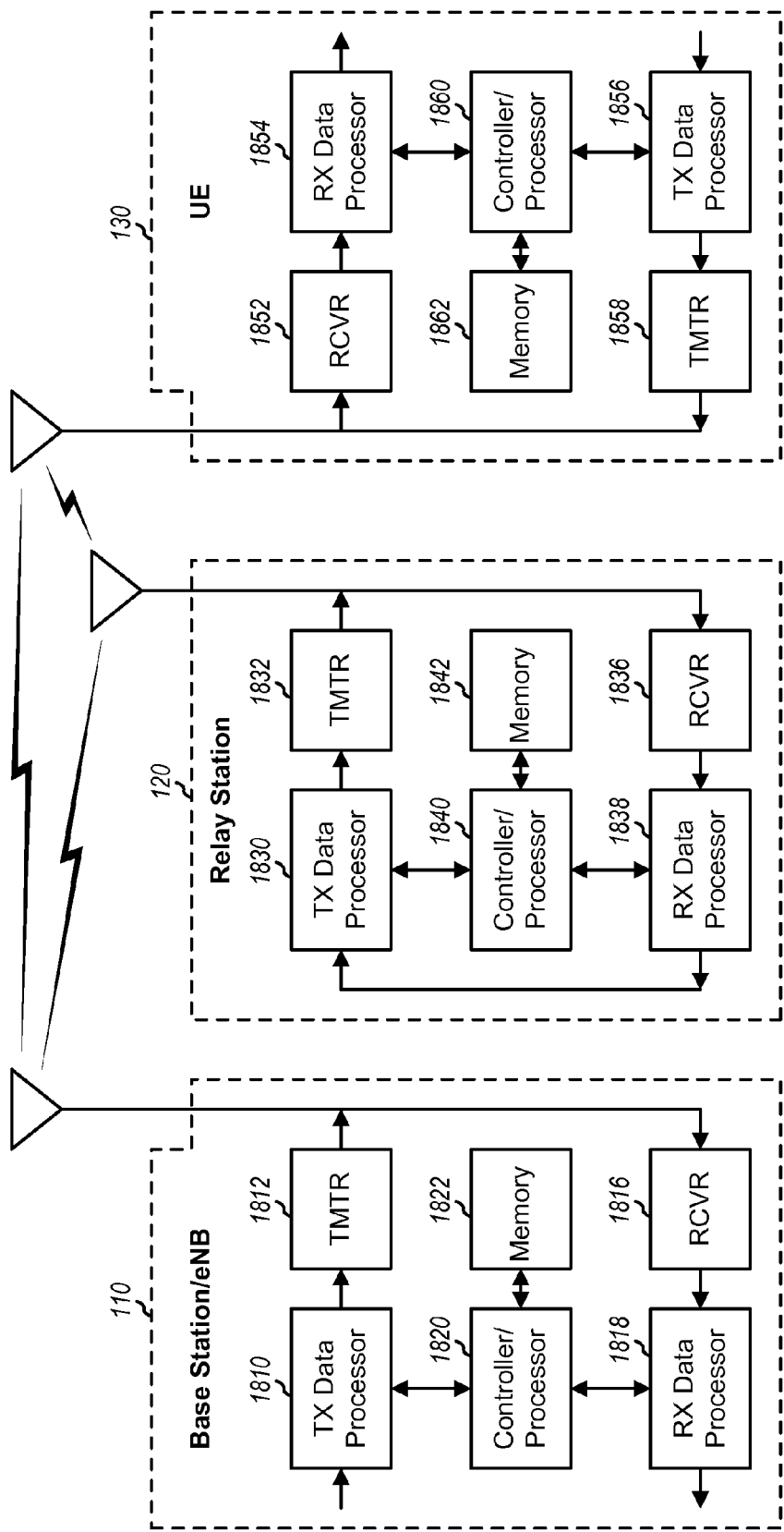
FIG. 18 shows a block diagram of a base station, a relay station, and a UE.

FIG. 18 shows a block diagram of a design of base station/eNB 110, relay station 120, and UE 130. Base station 110 may send transmissions to one or more UEs on the downlink and may also receive transmissions from one or more UEs on the uplink. For simplicity, processing for transmissions sent to and received from only UE 130 is described below.

At base station 110, a transmit (TX) data processor 1810 may receive packets of data to send to UE 130 and other UEs and may process (e.g., encode and modulate) each packet in accordance with a selected MCS to obtain data symbols. For HARQ, processor 1810 may generate multiple transmissions of each packet and may provide one transmission at a time. Processor 1810 may also process control information to obtain control symbols, generate reference symbols for reference signal, and multiplex the data symbols, the control symbols, and the reference symbols. Processor 1810 may further process the multiplexed symbols (e.g., for OFDM, etc.) to generate output samples. A transmitter (TMTR) 1812 may condition (e.g., convert to analog, amplify, filter, and upconvert) the output samples to generate a downlink signal, which may be transmitted to relay station 120 and UEs.

At relay station 120, the downlink signal from base station 110 may be received and provided to a receiver (RCVR) 1836. Receiver 1836 may condition (e.g., filter, amplify, downconvert, and digitize) the received signal and provide input samples. A receive (RX) data processor 1838 may process the input samples (e.g., for OFDM, etc.) to obtain received symbols. Processor 1838 may further process (e.g., demodulate and decode) the received symbols to recover control information and data sent to UE 130. A TX data processor 1830 may process (e.g., encode and modulate) the recovered data and control information from processor 1838 in the same manner as base station 110 to obtain data symbols and control symbols. Processor 1830 may also generate reference symbols, multiplex the data symbols and control symbols with the reference symbols, and process the multiplexed symbol to obtain output samples. A transmitter 1832 may condition the output samples and generate a downlink relay signal, which may be transmitted to UE 130.

At UE 130, the downlink signal from base station 110 and the downlink relay signal from relay station 120 may be received and conditioned by a receiver 1852, and processed by an RX data processor 1854 to recover the control information and data sent to UE 130. A controller/processor 1860 may generate ACK information for correctly decoded packets. Data and control information (e.g., ACK information) to be sent on the uplink may be processed by a TX data processor 1856 and conditioned by a transmitter 1858 to generate an uplink signal, which may be transmitted to relay station 120.

At relay station 120, the uplink signal from UE 130 may be received and conditioned by receiver 1836, and processed by RX data processor 1838 to recover the data and control information sent by UE 130. The recovered data and control information may be processed by TX data processor 1830 and conditioned by transmitter 1832 to generate an uplink relay signal, which may be transmitted to base station 110. At base station 110, the uplink relay signal from relay station 120 may be received and conditioned by a receiver 1816, and processed by an RX data processor 1818 to recover the data and control information sent by UE 130 via relay station 120. A controller/processor 1820 may control transmission of data based on the control information from UE 130.

Controllers/processors 1820, 1840 and 1860 may direct operation at base station 110, relay station 120, and UE 130, respectively. Controller/processor 1840 may perform or direct process 1000 in FIG. 10, process 1200 in FIG. 12, process 1400 in FIG. 14, process 1600 in FIG. 16, and/or other processes for the techniques described herein. Controller/processor 1820 may perform or direct process 1000, 1200, 1400, 1600 and/or other processes for the techniques described herein. Controller/processor 1860 may also perform or direct process 1000, 1200, 1400, 1600 and/or other processes for the techniques described herein. Memories 1822, 1842 and 1862 may store data and program codes for base station 110, relay 120, and UE 130, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    sending a first transmission of a packet from a transmitter station to a receiver station;
        receiving no information at the transmitter station related to whether the first transmission of the packet was successfully decoded at the receiver station; suspending transmission of the packet by the transmitter station in response to receiving no information related to whether the first transmission of the packet was successfully decoded at the receiver station;
        receiving from the receiver station a resource grant, wherein said resource grant indicates whether to resend the packet or send another packet;
    sending a second transmission of the packet from the transmitter station to the receiver station if the resource grant indicates to resend the packet and
    sending a first transmission of the other packet if the resource grant indicates to send the other packet, wherein ACK information for the first transmission of the packet is sent by the receiver station but is not received by the transmitter station due to no opportunity to receive the ACK information and wherein the no opportunity to receive the ACK information is due to the transmitter station either listening for at least one of system information on a physical broadcast channel or a synchronization signal from another station or transmitting at least one of system information on a physical broadcast channel or a synchronization signal.

2. The method of claim 1, wherein ACK information for the first transmission of the packet is not sent by the receiver station due to no opportunity to send the ACK information.

3. The method of claim 2, wherein the no opportunity to send the ACK information is due to the receiver station listening for at least one of system information on a physical broadcast channel or a synchronization signal from another station.

4. The method of claim 2, wherein the no opportunity to send the ACK information is due to the receiver station transmitting at least one of system information on a physical broadcast channel or a synchronization signal to another station.

5. The method of claim 1, wherein the receiving no information related to whether the first transmission of the packet was successfully decoded at the receiver station is determined based on detection of an ACK channel not being transmitted.

6. The method of claim 1, wherein the first and second transmissions of the packet are sent in subframes of a first interlace, and wherein ACK information for transmissions of the packet is sent in subframes of a second interlace.

7. The method of claim 1, wherein the first and second transmissions of the packet are not restricted to subframes of an interlace.

8. The method of claim 1, wherein the transmitter station is a user equipment (UE) and the receiver station is a relay station.

9. The method of claim 1, wherein the transmitter station is a relay station and the receiver station is a user equipment (UE).

10. The method of claim 1, wherein the transmitter station is a relay station and the receiver station is a base station.

11. The method of claim 1, wherein the transmitter station is a base station and the receiver station is a relay station.

12. An apparatus for wireless communication, comprising:
   means for sending a first transmission of a packet from a transmitter station to a receiver station;
   means for receiving no information at the transmitter station related to whether the first transmission of the packet was successfully decoded at the receiver station;
   means for suspending transmission of the packet by the transmitter station in response to receiving no information related to whether the first transmission of the packet was successfully decoded at the receiver station;
   means for receiving from the receiver station a resource grant, wherein said resource grant indicates whether to resend the packet or send another packet;
   means for sending a second transmission of the packet from the transmitter station to the receiver station if the resource grant indicates to resend the packet; and
   means for sending a first transmission of the other packet if the resource grant indicates to send the other packet, wherein ACK information for the first transmission of the packet is sent by the receiver station but is not received by the transmitter station due to no opportunity to receive the ACK information and wherein the no opportunity to receive the ACK information is due to the transmitter station either listening for at least one of system information on a physical broadcast channel or a synchronization signal from another station or transmitting at least one of system information on a physical broadcast channel or a synchronization signal.

13. The apparatus of claim 12, wherein ACK information for the first transmission of the packet is not sent by the receiver station due to no opportunity to send the ACK information.

14. The apparatus of claim 13, wherein the no opportunity to send the ACK information is due to the receiver station listening for at least one of system information on a physical broadcast channel or a synchronization signal from another station.

15. The apparatus of claim 13, wherein the no opportunity to send the ACK information is due to the receiver station transmitting at least one of system information on a physical broadcast channel or a synchronization signal to another station.

16. An apparatus for wireless communication, comprising:
   at least one processor configured to send a first transmission of a packet from a transmitter station to a receiver station, to receive no information at the transmitter station related to whether the first transmission of the packet was successfully decoded at the receiver station, to suspend transmission of the packet by the transmitter station in response to receiving no information related to whether the first transmission of the packet was successfully decoded at the receiver station, to receive from the receiver station a resource grant, wherein said resource grant indicates whether to resend the packet or send another packet, to send a second transmission of the packet from the transmitter station to the receiver station if the resource grant indicates to resend the packet, and to send a first transmission of the other packet if the resource grant indicates to send the other packet, wherein ACK information for the first transmission of the packet is sent by the receiver station but is not received by the transmitter station due to no opportunity to receive the ACK information and wherein the no opportunity to receive the ACK information is due to the transmitter station either listening for at least one of system information on a physical broadcast channel or a synchronization signal from another station or transmitting at least one of system information on a physical broadcast channel or a synchronization signal.

17. The apparatus of claim 16, wherein ACK information for the first transmission of the packet is not sent by the receiver station due to no opportunity to send the ACK information.

18. The apparatus of claim 17, wherein the no opportunity to send the ACK information is due to the receiver station listening for at least one of system information on a physical broadcast channel or a synchronization signal from another station.

19. The apparatus of claim 17, wherein the no opportunity to send the ACK information is due to the receiver station transmitting at least one of system information on a physical broadcast channel or a synchronization signal to another station.

20. A non-transitory machine readable medium comprising code that when executed on at least one processor performs the steps of:
   sending a first transmission of a packet from a transmitter station to a receiver station,
   receiving no information at the transmitter station related to whether the first transmission of the packet was successfully decoded at the receiver station,
   suspending transmission of the packet by the transmitter station in response to receiving no information related to whether the first transmission of the packet was successfully decoded at the receiver station,
   receiving from the receiver station a resource grant, wherein said resource grant indicates whether to resend the packet or send another packet;
   sending a second transmission of the packet from the transmitter station to the receiver station if the resource grant indicates to resend the packet; and
   sending a first transmission of the other packet if the resource grant indicates to send the other packet, wherein ACK information for the first transmission of the packet is sent by the receiver station but is not received by the transmitter station due to no opportunity to receive the ACK information and wherein the no opportunity to receive the ACK information is due to the transmitter station either listening for at least one of system information on a physical broadcast channel or a synchronization signal from another station or transmitting at least one of system information on a physical broadcast channel or a synchronization signal.

21. A method for wireless communication, comprising:
receiving a first transmission of a packet sent from a transmitter station to a receiver station;
determining that transmission of the packet has been suspended by the transmitter station due to the transmitter station receiving no information related to whether the first transmission of the packet was successfully decoded at the receiver station;
sending to the transmitter station a resource grant, wherein said resource grant indicates whether to resend the packet or send another packet;
receiving a second transmission of the packet from the transmitter station to the receiver station if the resource grant indicates to resend the packet; and
receiving a first transmission of the other packet if the resource grant indicates to send the other packet, wherein ACK information for the first transmission of the packet is sent by the receiver station but is not received by the transmitter station due to no opportunity to receive the ACK information and wherein the no opportunity to receive the ACK information is due to the transmitter station either listening for at least one of system information on a physical broadcast channel or a synchronization signal from another station or transmitting at least one of system information on a physical broadcast channel or a synchronization signal.

22. The method of claim 21, further comprising:
sending no ACK information for the first transmission of the packet to the transmitter station due to no opportunity to send the ACK information, and wherein suspension of the packet transmission by the transmitter station is determined by the receiver station based on no ACK information being sent by the receiver station.

23. The method of claim 21, further comprising:
sending ACK information for the first transmission of the packet to the transmitter station, wherein the ACK information is not received by the transmitter station due to no opportunity to receive the ACK information, and wherein suspension of the packet transmission by the transmitter station is determined by the receiver station based on no transmission of the packet being received by the receiver station in response to the ACK information.

24. An apparatus for wireless communication, comprising:
means for receiving a first transmission of a packet sent from a transmitter station to a receiver station;
means for determining that transmission of the packet has been suspended by the transmitter station due to the transmitter station receiving no information related to whether the first transmission of the packet was successfully decoded at the receiver station;
means for sending to the transmitter station a resource grant, wherein said resource grant indicates whether to resend the packet or send another packet;
means for receiving a second transmission of the packet from the transmitter station to the receiver station if the resource grant indicates to resend the packet; and
means for receiving a first transmission of the other packet if the resource grant indicates to send the other packet, wherein ACK information for the first transmission of the packet is sent by the receiver station but is not received by the transmitter station due to no opportunity to receive the ACK information and wherein the no opportunity to receive the ACK information is due to the transmitter station either listening for at least one of system information on a physical broadcast channel or a synchronization signal from another station or transmitting at least one of system information on a physical broadcast channel or a synchronization signal.

25. The apparatus of claim 24, further comprising:
means for sending no ACK information for the first transmission of the packet to the transmitter station due to no opportunity to send the ACK information, and wherein suspension of the packet transmission by the transmitter station is determined by the receiver station based on no ACK information being sent by the receiver station.

26. The apparatus of claim 24, further comprising:
means for sending ACK information for the first transmission of the packet to the transmitter station, wherein the ACK information is not received by the transmitter station due to no opportunity to receive the ACK information, and wherein suspension of the packet transmission by the transmitter station is determined by the receiver station based on no transmission of the packet being received by the receiver station in response to the ACK information.

27. An apparatus for wireless communication, comprising:
at least one processor configured to:
receive a first transmission of a packet sent from a transmitter station to a receiver station;
determine that transmission of the packet has been suspended by the transmitter station due to the transmitter station receiving no information related to whether the first transmission of the packet is successfully decoded at the receiver station;
send to the transmitter station a resource grant, wherein said resource grant indicates whether to resend the packet or send another packet;
receive a second transmission of the packet from the transmitter station to the receiver station if the resource grant indicates to resend the packet; and
receive a first transmission of the other packet if the resource grant indicates to send the other packet, wherein ACK information for the first transmission of the packet is sent by the receiver station but is not received by the transmitter station due to no opportunity to receive the ACK information and wherein the no opportunity to receive the ACK information is due to the transmitter station either listening for at least one of system information on a physical broadcast channel or a synchronization signal from another station or transmitting at least one of system information on a physical broadcast channel or a synchronization signal.

28. The apparatus of claim 27, wherein the at least one processor is further configured to: send no ACK information for the first transmission of the packet to the transmitter station due to no opportunity to send the ACK information, and wherein suspension of The packet transmission by the transmitter station is determined by the receiver station based on no ACK information being sent by the receiver station.

29. The apparatus of claim 27, wherein the at least one processor is further configured to: send ACK information for the first transmission of the packet to the transmitter station, wherein the ACK information is not received by the transmitter station due to no opportunity to receive the ACK information, and wherein suspension of the packet transmission by the transmitter station is determined by the receiver station based on no transmission of the packet being received by the receiver station in response to the ACK information.

30. A non-transitory machine readable medium comprising code that when executed on at least one processor performs the steps of:
receiving a first transmission of a packet sent from a transmitter station to a receiver station, determining that transmission of the packet has been suspended by the transmitter station due to the transmitter station receiving no information related to whether the first transmission of the packet is successfully decoded at the receiver station, sending to the transmitter station a resource grant, wherein said resource grant indicates whether to resend the packet or send another packet;

receiving a second transmission of the packet from the transmitter station to the receiver station if the resource grant indicates to resend the packet; and receiving a first transmission of the other packet if the resource grant indicates to send the other packet, wherein ACK information for the first transmission of the packet is sent by the receiver station but is not received by the transmitter station due to no opportunity to receive the ACK information and wherein the no opportunity to receive the ACK information is due to the transmitter station either listening for at least one of system information on a physical broadcast channel or a synchronization signal from another station or transmitting at least one of system information on a physical broadcast channel or a synchronization signal.

* * * * *